United States Patent
Hager et al.

(10) Patent No.: US 8,975,335 B2
(45) Date of Patent: Mar. 10, 2015

(54) PROCESS FOR THE PRODUCTION OF HIGH AIR FLOW POLYETHER FOAMS AND THE FOAMS PRODUCED BY THIS PROCESS

(75) Inventors: Stanley L. Hager, Cross Lanes, WV (US); Bruce Britt, Scott Depot, WV (US); Susan McVey, Charleston, WV (US); Micah Moore, Red House, WV (US); Peter Uthe, Charleston, WV (US); Jack R. Reese, Hurricane, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 695 days.

(21) Appl. No.: 13/241,617

(22) Filed: Sep. 23, 2011

(65) Prior Publication Data

US 2013/0079429 A1    Mar. 28, 2013

(51) Int. Cl.
| | |
|---|---|
| C08L 75/08 | (2006.01) |
| C08J 9/35 | (2006.01) |
| C09K 3/00 | (2006.01) |
| C08G 18/48 | (2006.01) |
| C08G 18/28 | (2006.01) |
| C08G 18/40 | (2006.01) |
| C08G 101/00 | (2006.01) |

(52) U.S. Cl.
CPC ............ C08G 18/4837 (2013.01); C08L 75/08 (2013.01); C08G 18/4866 (2013.01); C08G 18/283 (2013.01); C08G 18/4072 (2013.01); C08G 18/4812 (2013.01); C08G 2101/0008 (2013.01); C08G 2101/005 (2013.01); C08G 2101/0083 (2013.01); C08J 2205/05 (2013.01); C08J 2205/06 (2013.01); C08J 2375/04 (2013.01)
USPC ........................................................ 525/123

(58) Field of Classification Search
CPC ............. C08G 18/283; C08G 18/4804; C08G 18/4808; C08G 18/4812; C08G 18/4816
USPC .......................................................... 521/123
See application file for complete search history.

(56) References Cited

U.S. PATENT DOCUMENTS

| | | |
|---|---|---|
| 3,405,077 A | 10/1968 | Pastor et al. |
| 3,433,752 A | 3/1969 | Zagoren et al. |
| 3,454,504 A | 7/1969 | Murai et al. |
| 3,875,086 A * | 4/1975 | Ramey et al. ................. 521/160 |
| 4,209,593 A | 6/1980 | Khanna |
| 4,656,196 A | 4/1987 | Kelly et al. |
| 4,670,477 A | 6/1987 | Kelly et al. |

(Continued)

FOREIGN PATENT DOCUMENTS

JP         2000290344 A     10/2000

*Primary Examiner* — Mike M Dollinger
(74) *Attorney, Agent, or Firm* — N. Denise Brown

(57) ABSTRACT

This invention relates to novel polyol blends, a process for preparing foams with very low resistance to air flow from certain polyol blends and to the resultant foams. The polyol blends comprise one or more monofunctional polyethers having a hydroxyl number of less than 28; one or more polyether polyols having a hydroxyl number of 20 to 240 and containing at least 50% of copolymerized oxyethylene; one or more polyether polyols having a hydroxyl number of 47 to 300 and containing from 5 to 40% of copolymerized oxyethylene; and optionally, one or more polyether polyols having a hydroxyl number of 10 to 45. This process of the invention comprises reacting one or more polyisocyanates, with an isocyanate-reactive component which comprises a specific polyol blend, in the presence of at least one catalyst, at least one surfactant and at least one blowing agent.

32 Claims, 1 Drawing Sheet

(56) References Cited

U.S. PATENT DOCUMENTS

| | | | |
|---|---|---|---|
| 4,950,695 A | 8/1990 | Stone | |
| 4,981,880 A | 1/1991 | Lehmann et al. | |
| 5,631,319 A | 5/1997 | Reese et al. | |
| 6,034,145 A * | 3/2000 | Cornet et al. | 521/116 |
| 6,034,197 A | 3/2000 | Mahon et al. | |
| 6,063,309 A * | 5/2000 | Hager et al. | 252/182.24 |
| 6,136,879 A | 10/2000 | Nishida et al. | |
| 6,391,933 B1 | 5/2002 | Mattesky | |
| 6,391,935 B1 | 5/2002 | Hager et al. | |
| 6,638,986 B2 | 10/2003 | Falke et al. | |
| 6,838,516 B2 * | 1/2005 | Dai et al. | 525/58 |
| 7,754,809 B2 * | 7/2010 | Stollmaier et al. | 524/591 |
| 2008/0139685 A1 | 6/2008 | Reese et al. | |
| 2009/0062416 A1 | 3/2009 | Sasaki et al. | |
| 2009/0215918 A1 | 8/2009 | Sasaki et al. | |
| 2010/0168262 A1 | 7/2010 | Sasaki et al. | |
| 2012/0202908 A1 | 8/2012 | Sasaki et al. | |

* cited by examiner

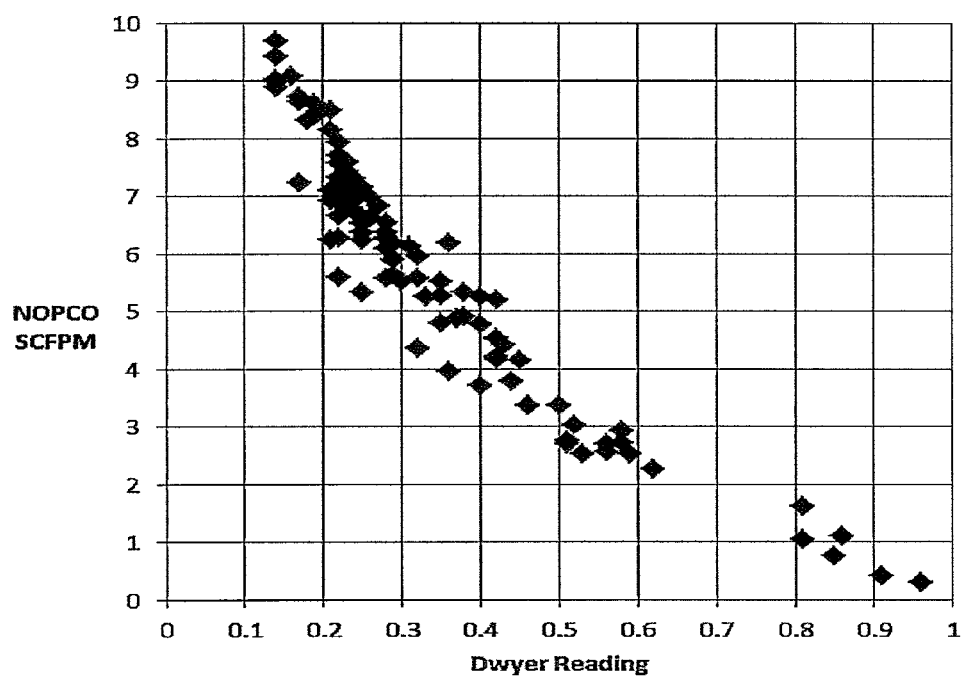

PROCESS FOR THE PRODUCTION OF HIGH AIR FLOW POLYETHER FOAMS AND THE FOAMS PRODUCED BY THIS PROCESS

BACKGROUND OF THE INVENTION

This invention relates to open celled polyurethane foams having very low resistance to air flow and to a process for producing these foams.

Flexible polyurethane foams and processes for their production are known and described in the art. In general, these foams are prepared by reacting organic and/or modified organic polyisocyanates with one or more compounds having a higher functionality and containing at least two hydrogen atoms that are capable of reacting with the NCO groups of the polyisocyanates, and optionally, chain extenders and/or crosslinking agents, in the presence of catalysts, blowing agents, additives, etc. The preparation of flexible polyurethane foams is described in Kunststoff-Handbuch, Volume VIII, Polyurethane, $1^{st}$ Edition 1966, Edited by Dr. R. Vieweg and Dr. A. Hochtlen, and $2^{nd}$ Edition, 1983, and $3^{rd}$ Edition, 1993, each edited by Dr. G. Oertel (Carl Hanser Verlag, Munich).

Flexible polyurethane foam is used widely in the comfort cushion market (furniture, bedding, automotive); in the textile area (apparel, blankets); in the industrial packaging and vibration insulating fields; in other household furnishings and sponges; filters, and the like. The versatility of polyurethane foam, permitting its use in diverse markets, results in substantial part from the nature and variety of the raw materials which are used to produce the foam products, as well as the manner in which the raw materials and the resultant foam are processed. Foams ranging widely in density and hardness, in tensile and tear properties, in resistance to compression set and fatigue, in resilience, deformation, recovery rate and hysteresis, in durability and toughness are obtained by selection and variation in raw materials and processing conditions. An important further characteristic in foam that likewise varies widely is its breathability, or resistance to air flow, of the basic cellular structure.

Cellular solid polymer foam has a skeletal framework of relatively heavy strands which form an outline for the cell structure. The strands of the skeletal framework are conventionally connected by very thin membranes, or windows, which form the walls of the cells. In open-celled foams, some of the windows are open or torn in each cell, thus forming an interconnecting network open to air flow. As produced, flexible polyurethane foams contain some cell windows that are either closed or only partially open and are not sufficiently porous or open-celled to exhibit very low resistance to air flow. For certain types of flexible foams such as HR and some viscoelastic foams a mechanical crushing step is employed to enhance air flow; however, this is of limited use for producing very high air flow foams due to windows that are not crushed open and to the residual fractured cell membranes that are still present.

Reticulated foams in which the cell windows have been completely or almost completely removed have a wide variety of applications, including safety fuel tanks, printer rollers, filters, etc. The production of reticulated foams has generally been accomplished by post-forming methods to increase the degree of openess of the cell structure, by breaking or removing the residual cell windows of these foams. Chemical, mechanical shock and thermal reticulation means have all been used.

Reticulated foams could be suitable for other application areas, such as mattresses, pillows, furniture, etc., if they could be easily produced in situ with readily available raw materials and without the need for a separate chemical or mechanical process to remove the cell windows. If these foams could also be prepared in a way such that water penetration and flow through the foams was attainable, then these could also be used in other application areas such as sponges, lawn furniture, gutter guards, wipes, etc.

Various references disclose open celled foams and processes for the production of these foams. These include, for example, U.S. Pat. Nos. 3,433,752, 3,454,504, 4,656,196, 4,670,477, 6,391,933, 6,391,935 and 6,638,986.

Although foams are mainly prepared from higher molecular weight compounds having at least two groups which are reactive with NCO groups of the polyisocyanate, and lower molecular weight chain extenders and crosslinking agents, the use of monofunctional compounds in foam is also known and described. See, for example, U.S. Pat. Nos. 3,405,077, 3,875,086, 4,209,593, 4,950,695, 4,981,880, 5,631,319, 6,136,879 and 6,391,935. One reason to include monofunctional compounds is to produce a softer foam with lower load bearing as in U.S. Pat. Nos. 3,405,077, 3,875,086 and 4,981,880. U.S. Pat. No. 4,950,695 discloses the use of a monofunctional alcohol or polyether to prepare soft flexible polyurethane foams. Formulations in this reference also contain a 2000 to 6500 molecular weight triol. Other references such as U.S. Pat. No. 5,631,319 disclose the use of a $C1-C_{25}$ monoalcohol in combination with a hydroxyketone to form non-viscoelastic foam. U.S. Pat. No. 4,209,593 describes energy-absorbing foams that are prepared from a naphthol or other bulky monohydroxy compound The viscoelastic foams prepared in U.S. Pat. No. 6,136,879 may contain a polyether monol which has a molecular weight of less than 1500 with a polyol having a molecular weight greater than 1800. All of the examples were prepared at isocyanate indices of less than 90.

U.S. Pat. No. 6,391,935 also describes viscoelastic foams. These foams are prepared from an isocyanate-reactive component that contains a low equivalent weight polyol and from about 15 to 70 wt. % of a polyester or polyoxyalkylene monol having a number average equivalent weight greater than about 1000. Foams of the '935 patent can be prepared over a broad range of processing conditions and isocyanate indices.

Advantages of the present invention include a process for the direct production of polyether flexible foams exhibiting very low resistance to air flow. High air flow is usually a desirable performance trait for flexible foam because it relates to improved recovery characteristics and durability. It has also been associated with improved comfort by enhancing the transfer of heat and moisture away from a body contacting an article manufactured with the foam. These foams also should be suitable for many applications that currently utilize very high air flow foams that can only be produced by subjecting the cured foam to a separate reticulation process. Reticulation is typically a slow and time consuming process that involves the use of specialized and expensive equipment. A direct process for producing very high air flow foams could significantly increase productions volumes and reduce conversion costs opening new high volume uses for the foam. This would be an advance welcomed by urethane foam producers, fabricators and end-users.

SUMMARY OF THE INVENTION

The present invention relates to novel polyol blends, a process for the production of open celled flexible polyurethane foam from certain polyol blends and to the very high air flow foams produced from these polyol blends.

The novel polyol blend of the present invention comprises:
1) from 5% to 40% (preferably from 10 to 30%) by weight, based on 100% by weight of said polyol blend, of one or more monofunctional polyethers having a hydroxyl number of less than or equal to 28 (preferably the hydroxyl number is less than about 20); and containing less than or equal to 20% by weight of copolymerized oxyethylene (preferably from 2% to less than or equal to 20% EO), based on the total weight of said monofunctional polyether;
2) from 2% to 80% (preferably from 15% to 70%) by weight, based on 100% by weight of said polyol blend, of one or more polyether polyols having a functionality of from 2 to 8, a hydroxyl number of from 240 to 20 and containing at least 50% by weight of copolymerized oxyethylene, based on the total weight of said polyether polyol (B)2);
3) from 10% to 70% (preferably from 20% to 50%) by weight, based on 100% by weight of said polyol blend, of one or more polyether polyols having a hydroxyl number of from 47 to 300, a functionality of from 2 to 8, and containing from 5% to 45% by weight of copolymerized oxyethylene, based on the total weight of said polyether polyol (B)3); and
4) from 0 to 50%, based on 100% by weight of said polyol blend, of a polyether polyol having a hydroxyl number of from 10 to 45 and a functionality of from 2 to 8.

Component (B)4 is preferably a polyether polyol capped with oxyethylene, in which a minimum of 40% of the total number of hydroxyl end groups contained in (B)4 are primary hydroxyl end groups.

In a particularly preferred embodiment, the novel polyol blends described above are those in which the percentage of primary hydroxyl groups on the monofunctional polyether, i.e. component (B)1, is less than 23% of the total hydroxyl equivalents contained on the monofunctional polyether.

This invention relates to a process for the production of an open celled, flexible polyurethane foam having low resistance to air flow, and to open celled, flexible polyurethane foam having low resistance to air flow The process comprising reacting:
(A) one or more di- or polyisocyanate components;
with
(B) an isocyanate-reactive component comprising:
  1) from 5% to 40% (preferably from 10% to 30%) by weight, based on 100% of the combined weight of components (B)1), (B)2), (B)3) and (B)4), of one or more monofunctional polyethers having an average hydroxyl number less than or equal to 56 (preferably less than or equal to about 28); and containing less than or equal to 20% by weight of copolymerized oxyethylene (preferably from 2% to less than or equal to 20% EO), based on 100% by weight of the monofunctional polyether (B)1);
  2) from 2% to 80% (preferably from 15% to 70%) by weight, based on 100% of the combined weight of components (B)1), (B)2), (B)3) and (B)4), of one or more polyether polyols having a functionality of from 2 to 8, a hydroxyl number of from 20 to 240, and containing at least 50% by weight of copolymerized oxyethylene, based on 100% by weight of the polyether polyol (B)2);
  3) from 10% to 70% (preferably from 20% to 50%) by weight, based on 100% of the combined weight of components (B)1), (B)2), (B)3) and (B)4), of one or more polyether polyols having a hydroxyl number of from 47 to 300, a functionality of from 2 to 8, and containing from 5% to 45% by weight of copolymerized oxyethylene, based on 100% by weight of the polyether polyol (B)3);
and
  4) from 0 to 50% (preferably from 5% to 30%) by weight, based on 100% of the combined weight of (B)1), (B)2), (B)3) and (B)4), of one or more polyether polyols having a hydroxyl number of from 10 to 45 and a functionality of from 2 to 8 (preferably a polyether polyol capped with oxyethylene in which a minimum of 40% of the total number of hydroxyl end groups contained in (B)4 are primary hydroxyl end groups);
in the presence of
(C) at least one catalyst;
(D) at least one surfactant;
and
(E) at least one blowing agent;
wherein the resultant foam is characterized by an air flow of greater than or equal to about 5 scfpm, and preferably greater than or equal to about 6 scfpm.

In a particularly preferred embodiment of the above described process, the isocyanate-reactive component (B) is one in which the monofunctional polyether, i.e. component 1), has a percentage of primary hydroxyl groups of less than 23% of the total hydroxyl equivalents present in the monofunctional polyether.

The open celled, flexible polyurethane foam of the present invention are characterized by an air flow of greater than or equal to about 5 scfpm, and preferably greater than or equal to about 6 scfpm. These foams comprise the reaction product of:
(A) one or more di- or polyisocyanate components;
with
(B) an isocyanate-reactive component comprising:
  1) from 5% to 40% (preferably from 10% to 30%) by weight, based on 100% of the combined weight of components (B)1), (B)2), (B)3) and (B)4), of one or more monofunctional polyethers having an average hydroxyl number less than or equal to 56 (preferably less than or equal to about 28); and containing less than or equal to about 20% by weight of copolymerized oxyethylene (preferably from 2 to less than or equal to about 20% of EO), based on 100% by weight of the monofunctional polyether (B)1);
  2) from 2% to 80% (preferably from 15% to 70%) by weight, based on 100% of the combined weight of components (B)1), (B)2), (B)3) and (B)4), of one or more polyether polyols having a functionality of from 2 to 8, a hydroxyl number of from 20 to 240, and containing at least 50% by weight of copolymerized oxyethylene, based on 100% by weight of the polyether polyol (B)2);
  3) from 10 to 70% (preferably from 20 to 50%) by weight, based on 100% of the combined weight of components (B)1), (B)2), (B)3) and (B)4), of one or more polyether polyols having a hydroxyl number of from 47 to 300, a functionality of from 2 to 8, and containing from 5% to 45% by weight of copolymerized oxyethylene, based on 100% by weight of the polyether polyol (B)3);
and
  4) from 0 to 50% (preferably from 5% to 30%) by weight, based on 100% of the combined weight of (B)1), (B)2), (B)3) and (B)4), of one or more polyether polyols having a hydroxyl number of from 10 to 44 and a functionality of from 2 to 8 (preferably a polyether polyol capped with oxyethylene in which a minimum of 40% of the total number of hydroxyl end groups contained in component (B)4 are primary hydroxyl end groups);

in the presence of
(C) at least one catalyst;
(D) at least one surfactant; and
(E) at least one blowing agent.

A particularly preferred embodiment of the foams of the invention requires that the isocyanate-reactive component (B)1) the monofunctional polyether has a percentage of primary hydroxyl groups of less than 23% of the total hydroxyl equivalents present in the monofunctional polyether.

In another embodiment, open celled foams of the current invention can be produced which have 95% height recovery times of less than 5 second and preferably less than 3 seconds. This makes these foams suitable alternatives to resilient flexible foams used widely in the industry.

In another embodiment, open celled flexible foams of the current invention can be produced which have 95% height recovery times (ASTM D 3574-08 Test M) of greater than or equal to 5 seconds which makes these foams suitable alternatives to viscoelastic or memory foams used widely in the industry.

In another embodiment, open celled flexible foams of the current invention can be produced which have water droplet penetration times of less than 20 seconds and preferably less than 10 seconds. This makes these flexible foams suitable alternatives to hydrophilic foams.

BRIEF DESCRIPTION OF THE DRAWING

FIG. 1 is a graph which illustrates the relationship between the Dwyer pressure readings related to the resistance to airflow and the airflow of various foam samples measured by the NOPCO method described herein.

DETAILED DESCRIPTION OF THE INVENTION

As used herein, the following terms shall have the following meanings.

The term "molecular weight" refers to the number average molecular weight unless otherwise stated.

Isocyanate index is the relative stoicheometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provides an index of 100%.

The functionalities of the polyether polyols cited herein are so called nominal functionalities which are based solely on functionalities of the starter compounds that are added in preparing the polyols. Monofunctional impurities formed during alkoxylation with propylene oxide are not included in the calculation of functionality for the purposes of this invention.

The foams and process of producing the foams of the present invention may have an Isocyanate Index in the range of from 60 to 125, preferably from 80 to 115, and most preferably from 90 to 110. The Isocyanate Index may also be any combination of these upper and lower ranges, inclusive.

Polyisocyanates suitable for use in the invention contain two or more free NCO groups per molecule and are those conventionally used to make flexible polyurethane foam. Useful polyisocyanates include aromatic, aliphatic, and cycloaliphatic di- and polyisocyanates. Examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof. Preferred polyisocyanates are TDI (usually a mixture of 2,4- and 2,6-isomers), MDIs, and mixtures of these. The preferred diphenylmethane diisocyanates to be used herein have a monomeric MDI content of at least 50% by weight, and preferably of at least 60% by weight.

In accordance with the present invention, the isocyanate-reactive component typically comprises (B)1) from 5 to 40%, preferably from 10 to 30% by weight, based on 100% of the combined by weight of (B)1), (B)2), (B)3) and (B)4), of one or more monofunctional polyethers having an average hydroxyl number of less than or equal to 56 and containing less than 20% of copolymerized oxyethylene. Suitable monofunctional polyethers have an average hydroxyl number of less than or equal to 56, preferably less than or equal to 28, and more preferably less than 20. In addition, these monofunctional polyethers contain less than 20% by weight, preferably less than 15% by weight, and more preferably less than 10% by weight, based on 100% by weight of the monofunctional polyether, of copolymerized oxyethylene. These monofunctional polyethers also typically contain at least 0%, preferably at least 2% and most preferably at least 5%, based on 100% by weight of the monofunctional polyether, of copolymerized oxyethylene. The amount of copolymerized oxyethylene present in the monofunctional polyethers may vary between any combination of these upper and lower values, inclusive.

It is also preferred that the EO not be concentrated at the end of the monol resulting in an increase in the percentage of primary hydroxyl groups on the monol. Thus, the percentage of primary hydroxyl groups on the monofunctional polyether is preferred to be less than 23% of the total hydroxyl equivalents containing on the monofunctional polyether.

Suitable monofunctional polyethers for the present invention include, for example, those which are conveniently made by reacting a starter component with one active hydrogen per molecule with multiple equivalents of an epoxide such as ethylene oxide, propylene oxide, butylene oxides, or the like, or mixtures thereof. The epoxide can be polymerized using well-known techniques and a variety of catalysts, including alkali metals, alkali metal hydroxides and alkoxides, double metal cyanide complexes, and many others. The preferred starters are monoalcohols (methanol, ethanol, propanol, phenols, allyl alcohol, higher molecular weight alcohols, or the like). The monols can also be made by first producing a polyoxyalkylene diol or triol and then converting a controlled percentage of the hydroxyl groups to groups that are not reactive towards isocyanates; using known methods thus yielding a suitable monofunctional content.

The polyoxyalkylene monols can have virtually any desired arrangement of oxyalkylene units with the proviso that these contain less than 20% (preferably less than 15, and more preferably less than 10%) of copolymerized oxyethylene, based on 100% by weight of the monofunctional polyether. This weight percentage includes the initiator or starter and all of the added epoxide(s). It is preferred that all of the oxyethylene units are not concentrated at the end of the polyoxyalkylene monols to keep the primary hydroxyl group content at less than 23% as discussed above. For example, the monols can be PO homopolymers, block EO-PO copolymers, random EO/PO copolymers, PO polymers that are "tipped" with EO or with a mixture of EO and PO are possible but not preferred. These "tipped" PO polymers should use a mixture of EO and PO to achieve a particular oxyethylene content and/or a desired primary hydroxyl content (preferably less than 23%), or any other desired configuration. The so-called PO homopolymers are suitable, however, it is preferred that any suitable polyoxyalkylene molyol contain a minimum of 2 weight %, and preferably of 5 weight % of copolymerized oxyethylene.

A preferred class of monofunctional polyethers consists of polyoxyethylene-oxypropylene monols (i.e. monols produced with a cofeed of EO and PO) which have hydroxyl numbers less than or equal to 56 mg KOH/g, preferably less than or equal to 28 and more preferably less than 20 mg KOH/g. Additionally, it is preferred that the EO content be between 0% and 20%, more preferably between 2% and 15% and most preferably between 5 and 10%. It is also preferred that the EO not be concentrated at the end of the molecule to yield a primary hydroxyl percentage of less than 23% of all the hydroxyl groups present in the monol.

The monofunctional polyether component of the isocyanate-reactive component is present in an amount within the range of about 5 to about 40% by weight, based on 100% of the combined weight of components (B)1), (B)2), (B)3) and (B)4). A more preferred range is from about 10 to about 30% by weight.

With respect to the novel polyol blends of the present invention, suitable monofunctional polyethers are as described above with the exception that they are characterized by a hydroxyl number of less than or equal to 56, preferably less than or equal to 28 and more/most preferably less than 20. In addition, the monofunctional polyethers will preferably have a primary hydroxyl group content of less than 23% of the total hydroxyl groups contained in the monofunctional polyether. Suitable monofunctional polyethers will also contain less than 20% of copolymerized oxyethylene, and will preferably contain greater than 2% by weight of copolymerized oxyethylene and more preferably greater than 5%, based on the total weight of the monofunctional polyether. Double metal cyanide alkoxylation catalysts are preferred for producing the monofunctional polyethers.

In the novel polyol blends of the present invention, the remaining components 2), 3) and 4 of these blends correspond to those components which are described herein as being suitable for components (B)2), (B)3) and (B)4), respectively. It is preferred that one or more of components (B)2), (B)3) and (B)4) are prepared from double metal cyanide alkoxylation catalysts.

Suitable isocyanate-reactive components for the present invention additionally comprises (B)2) from 2 to 80%, preferably from 15 to 70% by weight, based on 100% of the combined weight of components (B)1), (B)2), (B)3) and (B)4), of one or more polyether polyols having a functionality of from 2 to 8, a hydroxyl number of from 20 to 240, and which contain at least 50% of copolymerized oxyethylene, based on 100% by weight of the polyether polyol.

These polyether polyols typically have functionalities of 2 or greater, and more preferably of at least 2.5. These polyether polyols also typically have functionalities of 8 or less, preferably 6 or less, and more preferably 4 or less. Most preferably, these polyether polyols have functionalities of about 3. In addition, these polyether polyols may have a functionality between any of the above values, inclusive, unless otherwise stated.

Polyether polyols suitable for component (B)2) are characterized by hydroxyl numbers in the range of from 20 to 240 mg KOH/g. These polyether polyols typically have hydroxyl numbers of at least about 20 mg KOH/g, preferably at least about 30 and more preferably at least about 35 mg KOH/g. In addition, the polyether polyols generally have hydroxyl numbers of about 240 mg KOH/g or less, preferably about 170 or less, and more preferably about 50 mg KOH/g or less. The suitable polyether polyols of the present invention may be characterized by a hydroxyl number between any of the above values, inclusive, unless otherwise stated.

The polyether polyols used as component (B)2) also contain at least 50%, preferably at least 60% and more preferably at least 70%, of copolymerized oxyethylene, based on 100% by weight of the polyether polyol. This weight percent includes the starter or initiator, and the all of the added epoxide(s). These polyether polyols will typically contain 99% or less of copolymerized oxyethylene, preferably 90% or less and more preferably 85% or less of copolymerized oxyethylene. Suitable polyether polyols herein may contain any amount of copolymerized oxyethylene between the above disclosed values, inclusive, unless otherwise stated.

Suitable polyether polyols as component (B)2) include those compounds which are conveniently made by reacting compounds having two or more active hydrogens (e.g., glycols, triols, tetrols, hexyls, polyfunctional amines and other polyfunctional starters known to those in the art) with one or more equivalents of an epoxide as described earlier. Like the monofunctional polyethers, the polyether polyols can have any desired arrangement of oxyalkylene units with the proviso that they contain at least 50% of copolymerized oxyethylene, based on the 100% by weight of the polyether polyol. Thus, the polyether polyols (B)2) can be EO homopolymers, block EO-PO copolymers, EO-capped polyoxypropylenes, PO capped polyoxyethylenes, random EO/PO copolymers, PO polymers that are "tipped" with a mixture of EO and PO to achieve the desired amount of copolymerized oxyethylene and/or a particular primary hydroxyl content, or any other desired configuration.

The isocyanate-reactive mixture (B) of the present invention additionally comprises 3) from 10 to 70%, preferably from 20 to 50% by weight, based on 100% of the combined weight of components (B)1), (B)2), (B)3) and (B)4), of one or more polyether polyols having a functionality of from 2 to 8, a hydroxyl number of from 47 to 300, and which contain from 5 to 45% of copolymerized oxyethylene, based on 100% by weight of the polyether polyol (B)3).

The suitable polyether polyols for (B)3) typically have nominal functionalities of about 2 or greater, and preferably of at least 2.5 and most preferably about 3. These polyether polyols also typically have functionalities of 8 or less, preferably 6 or less, and more preferably 4 or less. In addition, these polyether polyols may have a functionality between any of the above values, inclusive, unless otherwise stated. These polyether polyols which may be used as component (B)3) are characterized by hydroxyl numbers in the range of from 47 to 300 mg KOH/g. These polyether polyols typically have hydroxyl numbers of at least about 47 mg KOH/g, preferably at least about 56 and more preferably at least about 70 mg KOH/g. In addition, the polyether polyols generally have hydroxyl numbers of about 300 mg KOH/g or less, preferably about 240 or less, and more preferably about 170 mg KOH/g or less. The suitable polyether polyols of the present invention may be characterized by a hydroxyl number between any of the above values, inclusive, unless otherwise stated.

The polyether polyols used as component (B)3) also contain at least 5%, preferably at least 10% and more preferably at least 15%, of copolymerized oxyethylene, based on 100% by weight of the polyether polyol (B)3). These polyether polyols also contain 45% or less, preferably 40% or less, and more preferably 35% or less of copolymerized oxyethylene, based on 100% by weight of the polyether polyol (B)3). These weight percents include the starter or initiator, and the all of the added epoxide(s). Suitable polyether polyols herein may contain any amount of copolymerized oxyethylene between the above disclosed upper and lower values, inclusive, unless otherwise stated.

Suitable polyether polyols as component (B)3) include those compounds which are conveniently made by reacting compounds having two or more active hydrogens (e.g., glycols, triols, tetrols, hexyls, polyfunctional amines and other polyfunctional starters known to those in the art) with one or more equivalents of an epoxide as described earlier. Like the monofunctional polyethers, the polyether polyols can have any desired arrangement of oxyalkylene units with the proviso that they contain from 5% to 45% of copolymerized oxyethylene, based on the 100% by weight of the polyether polyol (B)3). Thus, the polyether polyols (B)3) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration.

In addition, the isocyanate-reactive component (B) may include 4) from 0 to 50% by weight, preferably from 5 to 30% by weight, based on 100% of the combined weight of (B)1), (B)2), (B)3) and (B)4), of one or more polyether polyols having a functionality of from 2 to 8, and a hydroxyl number of from 10 to 45.

Suitable polyether polyols for (B)4) typically have functionalities of about 2 or greater, preferably of at least 2.5 and more preferably of at least 2.8. These polyether polyols also typically have functionalities of 8 or less, preferably 6 or less, and more preferably 4 or less. Most preferably, polyether polyols (B)4) have a functionality of about 3. In addition, the polyether polyols (B)4) may have a functionality between any of the above values, inclusive, unless otherwise stated.

The polyether polyols which are suitable for component (B)4) are characterized by hydroxyl numbers in the range of from 10 to 45 mg KOH/g. These polyether polyols typically have hydroxyl numbers of at least about 10 mg KOH/g, preferably at least about 20 and more preferably at least about 28 mg KOH/g. In addition, the polyether polyols generally have hydroxyl numbers of about 45 mg KOH/g or less, preferably about 40 or less, and more preferably about 35 mg KOH/g or less. The suitable polyether polyols of the present invention may be characterized by a hydroxyl number between any of the above stated values, inclusive, unless otherwise stated.

In a preferred embodiment, the polyether polyols used as component (B)4) are polyether polyols capped with oxyethylene such that the resultant polyether polyol contains a minimum of 40% of primary hydroxyl end groups, based on the total number of hydroxyl groups. These polyether polyols capped with oxyethylene more preferably contain a minimum of 60% of primary hydroxyl end groups, and most preferably contain a minimum of 75% of primary hydroxyl end groups.

Suitable polyether polyols as component (B)4) include those compounds which are conveniently made by reacting compounds having two or more active hydrogens (e.g., glycols, triols, tetrols, hexyls, and polyfunctional amines) with one or more equivalents of an epoxide as described earlier. Like the monofunctional polyethers, the polyether polyols can have any desired arrangement of oxyalkylene units with the proviso that they contain a minimum of 40% of primary hydroxyl end groups, based on the total number of hydroxyl groups present in (B)4. Thus, the polyether polyols (B)4) can be block PO-EO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration.

In situations in which components (B)1), (B)2), (B)3) and/or (B)4 contain internal EO followed by an EO "tip" where the ratio of EO to the total oxide (PO+EO) increases, the transition from the internal EO ratio to the tip EO ratio can occur as a step change, linearly, non-linearly or any combination thereof. The total oxide feed rate can remain constant when transitioning or the individual oxide rates may change to reach the desired ratio either decreasing or increasing the total oxide feed rate. The oxide feeds can be stopped after the internal EO is fed and restarted at the desired ratio to meet the desired EO ratio in the "tip" or the transition can happen while maintaining the oxide feeds.

In a preferred embodiment of the present invention, (F) one or more isocyanate-reactive components (which are different than components (B)1), (B)2), (B)3) and (B)4) as described herein) may be additionally present in the open celled, flexible polyurethane foams and the process of producing these foams. In this embodiment, at least 50%, and preferably at least 75%, of the total equivalents of isocyanate-reactive groups which are present from all sources excluding the blowing agent, are from component (B), i.e. the combination of components (B)1), (B)2), (B)3) and (B)4), as described herein. Component (F) which is another source of isocyanate-reactive groups may consist of other conventional polyether polyols which are different than, and preferably exclude, components (B)1), (B)2), (B)3) and (B)4). Also suitable as component (F) are compounds such as polyester polyols, polyols derived from renewable resources, glycols, ethanolamines, amines, and other isocyanate-reactive compounds which are known and described in the art as being isocyanate-reactive.

Suitable blowing agents for the present invention include, for example chemical blowing agents, i.e. isocyanate reactive agents that generate blowing gases, such as for example water and formic acid and physical blowing agents such as carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, e.g. EP-A-0351614.

The amount of blowing agent or blowing agent mixture used is from 0.5 to 20%, preferably from 0.75 to 10% by weight, based in each case on the total weight of the component (B). When water is the blowing agent, it is typically present in an amount of from 0.5 to 10%, and preferably from 0.75 to 7% by weight, based on the total weight of the component (B). The addition of water can be effected in combination with the use of the other blowing agents described. In accordance with the present invention, water is the preferred blowing agent. Also, preferred is the use of water along with pressurized carbon dioxide that is dispersed in the polyol or resin blend and frothed by passing through a pressure let down device such as employed for example in the Henecke Novaflex, CarDio (Cannon Viking Limited) and Beamech ($CO_2$) machines, which are known by those skilled in the art.

The foam is produced in the presence of a surfactant, which helps to stabilize the foam until it cures. Suitable surfactants are those well known in the polyurethane industry. A wide variety of organosilicone surfactants are commercially available. Examples of suitable surfactants are Niax L-620 surfactant, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 4, preferably from about 0.2 to 3, parts per 100 parts of isocyanate-reactive mixture.

At least one polyurethane catalyst is required to catalyze the reactions of the monol, polyols and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate is particularly preferred. Preferred organoamine catalysts are tertiary amines such as trimethylamine, triethylamine, triethylenediamine, bis(2,2'-dimethyl-amino)ethyl ether, N-ethylmorpholine, diethylenetriamine, and the like. The polyurethane catalysts are typically used in an amount within the range of about 0.05 to about 3 parts, more preferably from about 0.1 to about 2 parts, per 100 parts of isocyanate-reactive mixture.

Flame retardants, antioxidants, pigments, dyes, liquid and solid fillers, and many other commercial additives can also be included in the foams in conventional amounts.

The foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

Although less preferred, a prepolymer approach to making the foams can also be used. In this approach, a significant portion of the isocyanate-reactive mixture is reacted with the polyisocyanate, and the resulting prepolymer is then reacted with the remaining components.

As used and referred to throughout the specification, air flow was measured in accordance with the NOPCO test procedure described by R. E. Jones and G. Fesman, "Journal of Cellular Plastics," January, 1965, Vol. No. 1, pp. 200-216, the disclosure of which is herein incorporated by reference, using a Amscor Model 1377 automated foam porosity tester. A 2 inch×2 inch×1 inch piece of foam was cut from near the center of the test specimens which itself was cut from the foam blocks after production. Air flow, expressed as standard cubic feet per minute (i.e. scfpm), was measured through the 1 inch thickness at a pressure differential of 0.5 inches of water less than atmospheric pressure. The air flow was in the direction of rise of the foam.

In some cases, a semiquantitative measurement of air flow resistance was made directly on the original test specimens before and after crushing using a portable air flow apparatus. This apparatus was patterned after those used widely in the industry for measuring air flow of foams on a production line. The device consists of a air blower (Dwyer Instruments Inc., Model 40441A) that blows air through a restrictor plate at the start of a 2.5 inch diameter shop vacuum cleaner hose that attaches to a 7 inch diameter plastic disc with a 2.25 inch diameter hole in the center for air to exit through. A Dwyer series 616W digital pressure transmitter was used to measure pressure in the vacuum cleaner hose through a ⅛ inch ID flexible hose fitting. The air pressure scale is adjusted to read 1.0 when the exit hole in the plastic disc is blocked and 0.0 when it is totally open. The air resistance of the foam is measured by pressing the plastic disc against the foam specimen resting on a flat surface. The data shown in FIG. 1 shows the relationship between the Dwyer pressure readings measured with this device for a series of foam specimens and the measured NOPCO values for 2"×2"×1" samples cut from the specimens. A air resistance of less than about 0.35 indicates an air flow of greater than about 5.

High air flow, along with other formulation components, can facilitate water penetration into the foam. Two tests were used to demonstrate this characteristic. In one test a drop of water is deposited onto the surface of the foam using an eye dropper, and the time until it penetrates fully (flat with the foam surface) into the foam is measured. A penetration time into the dry foam of less than 20 seconds and preferably less than 10 seconds indicates a good water penetration rate for most applications. In another test, a 2"×2"×1" specimen is cut from the foam sample and placed gently on a quiescent water surface and the time to fully submerge is recorded. A submergence time of less than 60 seconds indicates s good water penetration rate into a dry foam.

The test used to define foam recovery rate from deformation is the 95% height recovery time as described in ASTM D 3574-08 Test M. A recovery rate of less than 5 seconds, and preferably less than 3 seconds, indicates a fast recovering foam such as observed for resilient foam types. A recovery rate of greater than 5 seconds and preferably greater than 7 seconds is indicative of a slow recovery foam often referred to as "viscoelastic" or "memory" foam.

Other foam physical properties reported in the examples were measured per the standard procedures described in ASTM D3574-08.

The following examples further illustrate details for the processes and products of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Isocyanate A:
  toluene diisocyanate containing 80% by weight of the 2,4-isomer and 20% by weight of the 2,6-isomer
Isocyanate B:
  a polymethylene polyphenylisocyanate having an NCO group content of about 32-33% by weight, a functionality of about 2.3 and containing about 24% polymeric and 76% by weight monomeric diphenylmethane diisocyanate of which about 29% is the 2,4'-isomer
Isocyanate C:
  a polymethylene polyphenylisocyanate having an NCO group content of about 31-32% by weight, a functionality of about 2.7 and containing about 55% polymeric and 45% by weight of monomeric diphenylmethane diisocyanate of which about 96% is the 4,4'-isomer
Isocyanate D:
  a polymethylene polyphenylisocyanate having an NCO group content of about 32-33% by weight, a functionality of about 2.3 and containing about 22% polymeric and 78% by weight of monomeric diphenylmethane diisocyanate having a 4,4'-isomer content of about 83%, a 2,2'-isomer content of less than 1% and a 2,4'-isomer content of about 12%
Isocyanate E:
  a polymethylene polyphenylisocyanate having an NCO group content of about 32-33% by weight, a functionality of about 2.3 and containing about 22% polymeric and 78% by weight of monomeric diphenylmethane diisocyanate having a 4,4'-isomer content of about 83%, a 2,2'-isomer content of greater than 2% and a 2,4'-isomer content of about 11%
Monol A:
  a monofunctional polyether polyol having a hydroxyl number of about 18, and containing about 9% by weight of copolymerized oxyethylene
Diol A:
  a difunctional polyether polyol having a hydroxyl number of about 170, and containing about 23% of copolymerized oxyethylene
Diol C:
  a polyoxypropylene glycol having a molecular weight of 425 and an OH number of 265
Triol A:
  a trifunctional polyether polyol having a hydroxyl number of about 170, and containing about 23% of copolymerized oxyethylene
Polyol A:
  a glycerin started poly(oxypropylene oxyethylene) polyol having a hydroxyl number of about 37, and containing about 73% copolymerized oxyethylene
Polyol B:
  a glycerin started poly(oxyethylene) polyol having a hydroxyl number of about 168
Polyol C:
  a sorbitol starter poly(oxypropyleneoxyethylene) polyol having a hydroxyl number of about 100 and containing about 78% of copolymerized oxyethylene
Polyol D:
  a glycerin started poly(oxypropyleneoxyethylene) polyol having a hydroxyl number of about 36, and containing about 18% of oxyethylene as a cap to yield a primary hydroxyl end group content of greater than 80% by weight
Polyol E:
  a glycerin started poly(oxypropyleneoxyethylene) polyol having a hydroxyl number of about 28, and containing about 13% of oxyethylene as a cap to yield a primary hydroxyl end group content of about 80% by weight
Polyol F:
  a sorbitol started poly(oxypropyleneoxyethylene) polyol having a hydroxyl number of about 28, and containing about 15% of oxyethylene as a cap to yield a primary hydroxyl end group content of greater than about 80% by weight
Polyol G:
  a polymer polyol containing about 43% solids, and prepared by in situ polymerization of styrene and acrylonitrile in Polyol D
Polyol H:
  a polymer polyol blend of EO capped polyols, having a hydroxyl number of about 30, a total SAN solids content of about 10% by weight, and an average primary hydroxyl end group content of about 80% by weight
Polyol I:
  a trimethylolpropane initiated poly(oxypropyleneoxyethylene) polyol having a hydroxyl number of 42 and containing about 75% of copolymerized oxyethylene
Polyol J:
  a glycerin started poly(oxypropyleneoxyethylene) polyol having a hydroxyl number of about 53, and containing about 13% of internal spread oxyethylene to yield a primary hydroxyl end group content of less than about 5% (i.e. >95% secondary hydroxyl content). KOH was used as the alkoxylation catalyst.
Polyol K:
  a poly(oxypropyleneoxyethylene) polyol started with a combination of glycerin and propylene glycol to yield a nominal functionality of about 2.8, having a hydroxyl number of about 56, and containing about 7% of internal spread oxyethylene to yield a primary hydroxyl end group content of less than about 10% (i.e. >90% secondary hydroxyl content). DMC was used as the alkoxylation catalyst.
Polyol L:
  a glycerin started poly(oxypropylene) polyol having a hydroxyl number of about 56. KOH was used as the alkoxylation catalyst.
Polyol M:
  a glycerin started poly(oxypropylene) polyol having a hydroxyl number of about 238
Antioxidant A:
  a hindered amine antioxidant, commercially available from BASF as IRGANOX 5057
Foam Modifier A:
  a foam modifier having a hydroxyl number of about 1240, commercially available from Momentive Performance Materials as Arcol DP-1022
Surfactant A:
  a silicone surfactant commercially available from Momentive Performance Materials as NIAX L 620
Surfactant B:
  a silicone surfactant commercially available from Momentive Performance Materials as NIAX L 618
Surfactant C:
  a silicone surfactant commercially available from Momentive Performance Materials as NIAX L 580

Catalyst A:
  an amine catalyst, commercially available from Momentive Performance Materials as NIAX A-1
Catalyst B:
  an amine catalyst, commercially available from Air Products as DABCO 33LV
Catalyst C:
  a tin catalyst, commercially available from Air Products DABCO T-9
Polyether Monol
Starter A:
  the reaction product of Neodol 25 (a mixture of aliphatic $C_{12}$-$C_{15}$ alcohols) with propylene oxide to yield a 35 OH number polyether monol.
Monol E:
  a monol-initiated polyether polyol; prepared by alkoxylating 5% of the total amount of EO at a PO/EO ratio of 71/29, then transitioning to a PO/EO ratio of 55/45 for 5% of the total EO. This monol was characterized by an OH Number of 25.2; a total EO content of 11.6%; and a % of primary OH groups of 25.2
General Process for the Preparation of Monols B through F:
  Polyether monol starter A (10.3-15.7 kg), described above, was charged to the reactor along with a double metal cyanide catalyst prepared according to the procedure disclosed in U.S. Pat. No. 5,482,908 (the disclosure of which is herein incorporated by reference). This mixture was heated to 130° C. with nitrogen stripping of the polyol/catalyst blend. Propylene oxide and/or ethylene oxide were charged to activate the catalyst. After activation, the reactor was maintained at 130° C., and propylene oxide and ethylene oxide were added over a 3.5 to 4 hour period. After digestion at 130° C. for 0.5 hours, the monofunctional polyether was stripped to remove any unreacted propylene oxide or ethylene oxide, cooled, and discharged. The characteristics of these monofunctional polyethers are set forth in Table 1A.

TABLE 1A

MONOLS

| Monols | Hydroxyl Number | PO/EO Ratio | Internal % EO/% EO Tip[1] | Total % EO (measured) | % Primary Hydroxyl |
|---|---|---|---|---|---|
| Monol A | 18 | 82/18 | 8.7%/0% | 8.7% | nm[2] |
| Monol B | 19.2 | 82/18 | 8.7%/0% | 9.7% | 15.6% |
| Monol C | 18.2 | 92/8 | 4.2%/0% | 5.8% | 16% |
| Monol D | 18.4 | 72/28 | 13.6%/0% | 14.8% | 19.5% |
| Monol E | 25.2 | [3] | 5%/5% | 11.6% | 25.2% |
| Monol F | 25.1 | 82/18 | 5.1%/0% | 7.0% | 11.2% |

[1]target amounts
[2]not measured
[3]see description of Monol E

Diol B:
  Three generations were made to reach the target diol (Diol B):
    Intermediate 1:
    The first generation polyether was prepared by charging Diol C (2.5 kg) to the reactor along with a double metal cyanide catalyst prepared according to the procedure disclosed in U.S. Pat. No. 5,482,908. This mixture was heated to 130° C. with nitrogen stripping of the polyol/catalyst blend. Propylene oxide and ethylene oxide were charged at PO/EO ratio of 82/18 to activate the catalyst. After activation, the reactor was maintained at 130° C. and propylene oxide and ethylene oxide (at a PO/EO ratio of 82/18) were added over a 3.5 hour period. Propylene glycol addition began after 125 g of oxide were added and was stopped after 12594 g of oxide. After digestion at 130° C. for 0.5 hours, the polyether was stripped to remove any unreacted alkylene oxides, cooled, and discharged. The resultant intermediate polyether was alkoxylated at PO/EO ratio of 82/18, had an OH number of 226, and the target EO content was 13.4%.
    Intermediate 2:
    Intermediate 1 was alkoxylated at PO/EO ratio of 82/18, propylene glycol addition started after the addition of 125 g of oxide and ended after 12553 g of oxide. The resultant intermediate polyether had an OH number of 227, and the target EO content was 15%.
  Final Diol B:
    Intermediate 2 was alkoxylated at a PO/EO ratio of 55/45. The final product (Diol B) had an OH Number of 170. Diol B was made with 11.8% of the total EO being alkoxylated at a PO/EO ratio of 82/18, and 11.3% of the total EO being alkoxylated at PO/EO ratio of 55/45. The final product, Diol B, was also characterized by a total EO content of 19.7%, and contained 26.1% of primary OH groups.

Preparation of Triols:
  Three processes were used to generate the Triols A through N. These include 1) a DMC catalyzed direct synthesis from all PO starters, 2) a KOH catalyzed direct synthesis from glycerin, and 3) a DMC and/or KOH catalyzed multistep syntheses where EO containing intermediates were first produced prior to the final Triol product.
  Triol D, Triol F, Triol K, Triol M, and Triol N were prepared by process 1), i.e. the DMC catalyzed direct synthesis from all PO starters. Triol M and N were started from Polyol M. Triol D, Triol F and Triol K were prepared from Triol Starter 1.
Triol Starter 1:
  Triol Starter 1 was prepared by alkoxylating Polyol M at a PO/EO ratio of 90/10, with glycerin feed being started after 25 g of oxide and stopped after 15917 g of oxide. The product, Triol Starter 1, had an OH number of 237, a total EO content of 9.7, and contained 11.9% of primary OH groups.
1) DMC Catalyzed Direct Synthesis:
  Triol Starter 1 (a glycerin based starter) was charged to the reactor along with a double metal cyanide catalyst prepared according to the procedure disclosed in U.S. Pat. No. 5,482,908. This mixture was heated to 130° C. with nitrogen stripping of the polyol/catalyst blend. Propylene oxide and ethylene oxide was charged to activate the catalyst. After activation, the reactor was maintained at 130° C. and propylene oxide, ethylene oxide and glycerin were added over a 4 hour period. After digestion at 130° C. for 0.5 hours, the polyether was stripped to remove any unreacted propylene oxide or ethylene oxide, cooled, and discharged. The details/characteristics of these polyols can be found in Table 1B and Table 1C.
  Triol G and Triol H were prepared by process 2), i.e. the KOH catalyzed direct synthesis.
2) KOH Catalyzed Direct Synthesis:
  Glycerin was charged to the reactor along with KOH catalyst. This mixture was heated to 117° C. with nitrogen stripping of the polyol/catalyst blend. The reactor was maintained at 117° C. and propylene oxide and ethylene oxide were added over an 8 hour period. After digestion at 117° C. for 1 hour, the polyether was stripped to remove any unreacted propylene oxide or ethylene oxide, cooled, and discharged.

The details/characteristics of these polyols can be found in Table 1C:

Triol B, Triol C, Triol E, Triol I and Triol J were prepared by process 3), a multistep synthesis.

3) Multistep Synthesis:

Multiple Product Generations:

For Triols B, C, E, I and J, multiple product generations were made to achieve greater chemical uniformity. When the starter material comprised a large percentage of the target material one to two generations of intermediates were made to dilute the starter and incorporate propylene oxide and ethylene oxide at the desired ratios throughout the backbone. All intermediates and products were DMC catalyzed except Intermediate D1 which was KOH catalyzed. The first generation began with an all PO starter and oxide was fed until the target EO % and PO/EO ratio were met to form the backbone polyol. If applicable, a second generation was produced, initiated from the first generation using a product-to-product process with the same % EO and PO/EO ratio as the first generation. The final generation produced the target polyol (i.e. the Triol product) via capping, continuous addition of starter (as described in U.S. Pat. No. 5,689,010, the disclosure of which is herein incorporated by reference), or product-to-product (as described in U.S. Published Patent Application 22080255378 A1, the disclosure of which is herein incorporated by reference) processes to afford the desired overall % EO and PO/EO ratio in the backbone and polymer tip.

Triol B:

Three generations were used to form this triol.

Intermediate B1:

Polyol M was alkoxylated at a PO/EO ratio of 82/18, with glycerin feed being started after 475 g of oxide and stopped after 12716 g of oxide to form Intermediate B1. Intermediate B1 was characterized by an OH number of 226; and had a target EO content of 13.8%.

Intermediate B2:

Intermediate B1 was alkoxylated at a PO/EO ratio of 82/18, with glycerin feed being started after 475 g of oxide and stopped after 12701 g of oxide. Intermediate B2 was characterized by an OH number of 228; and a total EO content of 15.5%.

Final Product—Triol B:

Intermediate B2 was alkoxylated at a PO/EO ratio of 55/45. Triol B, the final product, was characterized by an OH number of 169; with 11.8% of the total EO being alkoxylated at a PO/EO ratio of 82/18, followed by 11.3% of total the total EO alkoxylated at a PO/EO ratio of 55/45; such that Triol B had a total EO content of 25.1% and 31% of primary hydroxyl groups.

Triol C:

Three generations were used to form this Triol.

Intermediate C1:

Polyol M was alkoxylated at a PO/EO ratio of 76/24, with glycerin feed being started after 225 g of oxide and stopped after 14140 g of oxide to form Intermediate C1. Intermediate C1 was characterized by an OH number of 118 and a total EO Content of 21.7%.

Intermediate C2:

Intermediate C1 was alkoxylated at a PO/EO ratio of 76/24, with glycerin feed started after 225 g of oxide and stopped after 13976 g of oxide. Intermediate C2 was characterized by an OH number of 118, and a total EO content of 24.2%.

Final Product—Triol C:

Using Intermediate C2 as the starter, 15% of total EO was alkoxylated at a PO/EO ratio of 76/24, then transitioned to 15% of total EO alkoxylated at PO/EO ratio of 55/45, with glycerin feed being started after 275 g of oxide and stopped after 8772 g of oxide. Triol C was characterized by an OH number of 78.7; a total EO content of 31.4%; and 29.4% primary OH groups.

Triol E:

Two generations were used to reach the target material.

Intermediate E1:

Glycerin was alkoxylated at a PO/EO ratio of 93/7 using the KOH catalyzed procedure (2) described previously to form Intermediate E1. Intermediate E1 was characterized by an OH number of 536, and had a total EO content of 5%.

Final Product—Triol E:

Using Intermediate E1 as the starter, 5% of the total EO was alkoxylated at a PO/EO ratio of 93/7, then transitioned to 5% of the total EO alkoxylated at a PO/EO ratio of 55/45 to form Triol E. Triol E was characterized by an OH number of 237, a total EO content of 10.4%, and 12.2% of primary OH groups.

Triol I:

Three generations were used to reach the target material.

Intermediate I1:

Polyol M was alkoxylated at a PO/EO ratio of 68/32, with glycerin feed being started after 225 g of oxide and stopped after 15483 g of oxide to form Intermediate I1. Intermediate I1 was characterized by an OH Number of 179, and a total EO content of 28.2%.

Intermediate I2:

Intermediate I1 was alkoxylated at a PO/EO ratio of 68/32, with glycerin feed being started after 225 g of oxide and stopped after 13401 g of oxide to form Intermediate I2. Intermediate I2 was characterized by an OH number of 175, and a total EO content of 31.4.

Final Product—Triol I:

Intermediate I2 was alkoxylated at a PO/EO ratio of 68/32, with glycerin feed being started after 325 g of oxide and stopped after 14058 g of oxide to form the final product, Triol I. Triol I was characterized by an OH number of 116, a total EO content of 31.6, and 25.1% primary OH groups.

Triol J:

Three generations were used to reach the target material.

Intermediate J1:

Polyol M was alkoxylated at a PO/EO ratio of 57/43, with glycerin feed being started after 350 g of oxide and stopped after 12721 g of oxide, to form Intermediate J1. Intermediate J1 had an OH number of 238, and a target EO content of 32.6%.

Intermediate J2:

Intermediate J1 was alkoxylated at a PO/EO ratio of 57/43, with glycerin feed being started after 350 g of oxide and stopped after 12721 g of oxide, to form Intermediate J2. Intermediate J2 had an OH number of 239, and a target EO content of 36.6%.

Final Product—Triol J:

Using Intermediate J2 as the starter, 22.5% of the total EO was alkoxylated at a PO/EO ratio of 57/43, then transitioned to 22.5% of the total EO being alkoxylated at a PO/EO ratio of 45/55, with glycerin feed being started after 400 g of oxide and stopped after 7439 g of oxide to form Final Product Triol J. Triol J was characterized by an OH number of 117, had a total EO content of 47.7%, and contained 42% primary OH groups.

TABLE 1B

DIOLS A AND B AND TRIOLS A, L, M AND N

| Diol or Triol | Hydroxyl Number | PO/EO Ratio (Internal; Tip) | Internal % EO/% EO Tip[1] | Total % EO (measured) | % Primary Hydroxyl |
|---|---|---|---|---|---|
| Diol A | 170 | 82/18; 55/45 | 11.8%/ 11.3% | 23.1% | nm[2] |
| Diol B | 170 | [3] | 11.8%/ 11.3% | 19.7% | 26.1% |
| Triol A | 170 | 82/18; 55/45 | 11.8%/ 11.3% | 23.1% | nm[2] |
| Triol L | 56 |  | 8.1%/ 5.2% | 13.3% | 45% |
| Triol M | 55.9 | 65/35; —/— | 30.6% | 30.6% | 22.3% |
| Triol N | 33.8 | 66/34; —/— | 30.3% | 30.3% | 21.5% |

[1]target amounts
[2]not measured
[3]see description of Diol B

TABLE 1C

TRIOLS D, F, G, H AND K

| Triol | Hydroxyl Number | Initial PO:EO Ratio | Final PO:EO Ratio | Internal % EO/% EO Tip | Total % EO (measured) | % Primary Hydroxyl Groups |
|---|---|---|---|---|---|---|
| D | 172 | 5% @ 88:12 | 17% @ 55:45 | 5%/17% | 25% | 30.6% |
| F | 117 | 5% @ 81:19 | 25% @ 55:45 | 5%/25% | 31.9% | 34.9% |
| G | 242 | 5% @ 84:16 | 25% @ 55:45 | 5%/25% | 33.5% | 16.3% |
| H | 244 | 5% @ 93:7 | 25% @ 55:45 | 5%/25% | 12.7% | 6.4% |
| K | 121 | 5% @ 93:7 | 5% @ 55:45 | 5%/5% | 11.9% | 21.1% |

The free-rise bench scale foams of Tables 2A, 3A, 6A, 7A, 8A, 9A, 10A, 11A, 12A, 13A and 14A were prepared using the following procedure. The polyols, water, silicone surfactants, amine catalysts, tin catalyst and any other non-isocyanate additives were added to a cylindrical container fitted with baffles. The contents were mixed at 2400 rpm for 60 seconds with an agitator having two turbine impellers. The mixture was then degassed for 15 seconds. Tin Catalyst C, if employed, was added at this time. After degassing, the contents were mixed at 2400 rpm for 15 seconds, during which period the isocyanate was added when about 7 seconds of mixing time remained. The mixture was then poured into a 14×14×6-inch cardboard box, where it rose freely until the reaction was complete. A batch size sufficient to give a bun at least about 6 inches high was employed. The freshly prepared bun was cured for 5 minutes in an oven at 120° C. and then allowed to cure at ambient conditions for a minimum of 1 day. Observations made during foaming and curing are set forth in the Tables. The buns were then trimmed to 12×12×4 inches and were roller crushed 3 times to a minimum thickness of about 0.5 inches. In some cases (Tables 2A and 3A), the air resistance of the foams was measured before crushing and two hours after crushing using the Dwyer pressure apparatus described previously. These samples were then conditioned for at least 16 hours at standard temperature (~23° C.) and humidity (~50%) before being tested.

The discontinuous free-rise box machine foams of Table 4A were produced using essentially the same procedures as for the free-rise bench foams except on a larger scale. The Cannon-Viking box foam machine was used for these foams. All raw materials were added through a metering device, to a mix chamber (with maximum capacity of 120 kg) before being poured into a large open mold (~200 cm×200 cm×150 cm height) and allowed to cure at ambient temperature for a minimum of 1 day. Observations made during foaming and curing are set forth in the Tables. The buns were then trimmed to top, middle and bottom (15×15×4 inches) foam sections and were roller crushed 3 times to a minimum thickness of about 0.5 inches. These samples were then conditioned for at least 16 hours at standard temperature (~23° C.) and humidity (~50%) before being tested.

The free-rise continuous MiniMax machine foams of Table 5A were produced using an one-third scale Maxfoam machine with Novaflex $CO_2$ capabilities. The Maxfoam machine offers the ability to add four individual polyol streams, two individual isocyanate streams, and fourteen individual additive streams, and to control the temperature of each individual polyol and isocyanate stream. In addition, computer control of the Maxfoam machine allows systems and foam grades to be changed throughout foam pour. Foam blocks ranged in size up to about 122 cm×122 cm×3048 cm in length can be prepared. Each foam grade was typically cut in about 10 ft. bun sections. The buns were then trimmed to top, middle and bottom 15×15×4 inches foam sections and were roller crushed 3 times to a minimum thickness of about 0.5 inches. These samples were then conditioned for at least 16 hours at standard temperature (~23° C.) and humidity (~50%) before testing.

TABLE 2A

FREE-RISE BENCH SCALE FOAM FORMULATIONS

| Example | 1 | 2 | 3 | 4 | 5 | 6 |
|---|---|---|---|---|---|---|
| Polyol D | 10 | 10 | 10 | 10 | 10 | 10 |
| Polyol A | 30 | 30 | 30 | 30 | 30 | 30 |
| Monol A | 20 |  |  |  |  |  |
| Monol B |  | 20 |  |  |  |  |
| Monol C |  |  | 20 |  |  |  |
| Monol D |  |  |  | 20 |  |  |
| Monol E |  |  |  |  | 20 |  |
| Monol F |  |  |  |  |  | 20 |
| Diol A | 13 |  |  |  |  |  |
| Triol A | 27 |  |  |  |  |  |
| Triol B |  | 40 | 40 | 40 | 40 | 40 |
| Additives* | 5.53 | 5.53 | 5.53 | 5.53 | 5.53 | 5.53 |
| Iso A | 47.73 | 47.67 | 47.67 | 47.67 | 47.67 | 47.67 |
| NCO Index | 95 | 95 | 95 | 95 | 94.58 | 94.59 |
| Processing Details: |  |  |  |  |  |  |
| Cream Time (s) | 10 | 10 | 10 | 10 | 9 | 10 |
| Settle (%) | 1.68 | 1.4 | 2.76 | 1.88 | 3.04 | 2.67 |
| Cell Structure | Medium | Medium | Medium | Slightly coarse | Slightly coarse | Medium |
| Dwyer Reading (uncrushed) | 0.20 | 0.17 | 0.2 | 0.53 | 0.85 | 0.28 |
| Dwyer Reading (Crushed) | 0.19 | 0.17 | 0.19 | 0.42 | 0.68 | 0.26 |

*Additives include 3.8 php Water, 0.1 php Catalyst A (Niax A-1), 0.1 php Catalyst B (Niax A-33), 0.03 php Catalyst C (Dabco T-9), and 1.5 php Surfactant A (Niax L-620), 1.5 php

TABLE 2B

FREE-RISE BENCH SCALE FOAM PROPERTIES

| Property (units) | Example |  |  |  |  |  |
|---|---|---|---|---|---|---|
|  | 1 | 2 | 3 | 4 | 5 | 6 |
| Density (lb/ft³) | 1.54 | 1.55 | 1.56 | 1.6 | 1.55 | 1.57 |
| Resilience (%) | 23 | 22 | 22 | 21 | nm [(1)] | 21 |
| Air Flow (scfpm) | 8.5 | 8.9 | 9.3 | 4.2 | 1.9 | 7.1 |
| IFD 25% (lb/50 in²) | 10.7 | 10.4 | 7.0 | 12.1 | 14.2 | 12.3 |
| IFD 65% (lb/50 in²) | 20.0 | 19.7 | 13.8 | 23.7 | 27.2 | 23.2 |
| Ret. Val. @ 25% | 75.7 | 77.2 | 79.4 | 75.6 | 74.0 | 77.3 |
| S.F. 65%/25% | 1.9 | 1.9 | 2.0 | 2.0 | 1.9 | 1.9 |
| Tensile Str. (psi) | 10.1 | 12.0 | 9.0 | 6.9 | 6.0 | 7.1 |
| Elongation (%) | 158 | 155 | 138 | 79 | 68 | 88 |
| Tear Str. (pli) | 1.8 | 2.0 | 1.5 | 1.2 | 1.0 | 1.3 |
| Comp. Set 90% | 8.3 | 7.7 | 7.3 | 7.6 | 14.6 | 6.6 |
| HACS 75% | 9.4 | 5.7 | 2.1 | 5.6 | 10.6 | 4.5 |
| Wet Set 50% | 8.0 | 4.5 | 11.1 | 9.8 | 4.2 | 6.0 |
| 95% Ht. Recovery | <3 | <3 | <3 | <3 | <3 | <3 |

[(1)] not measured

TABLE 3A

FREE RISE BENCH SCALE FOAM FORMULATIONS

| Example | 1 | 2 | 7 | 8 | 9 | 10 | 11 |
|---|---|---|---|---|---|---|---|
| Polyol D | 10 | 10 | 10 | 10 | 10 | 10 | 10 |
| Polyol A | 30 | 30 | 30 | 30 | 30 | 30 | 30 |
| Monol A | 20 |  |  |  |  |  |  |
| Monol B |  | 20 | 20 | 20 | 20 | 20 | 20 |
| Diol A | 13 |  |  |  |  |  |  |
| Triol A | 27 |  |  |  |  |  |  |
| Triol B |  | 40 |  |  |  |  |  |
| Triol C |  |  | 40 |  |  |  |  |
| Triol D |  |  |  | 40 |  |  |  |
| Triol E |  |  |  |  | 40 |  |  |
| Triol F |  |  |  |  |  | 40 |  |
| Triol G |  |  |  |  |  |  | 40 |
| Additives* | 5.53 | 5.53 | 5.53 | 5.53 | 5.53 | 5.53 | 5.53 |
| Iso A | 47.73 | 47.67 | 47.67 | 42.37 | 47.79 | 47.79 | 47.79 |
| NCO Index | 95 | 95 | 106.9 | 95 | 95 | 87.95 | 191.9 |
| Processing Details: |  |  |  |  |  |  |  |
| Settle (%) | 1.68 | 1.4 | 1.56 | 1.31 | 2.65 | 1.23 | 2.39 |
| Cell Structure | Medium | Medium | Medium | Medium | Medium | Medium | Medium |
| Dwyer Reading (uncrushed) | 0.20 | 0.17 | 0.28 | 0.31 | 0.17 | 0.22 | 0.15 |
| Dwyer Reading (Crushed) | 0.19 | 0.17 | 0.27 | 0.21 | 0.17 | 0.19 | 0.15 |

FREE RISE BENCH SCALE FOAMS

| Example | 12 | 13 | 14 | 15 | 16 | 17 | **18 |
|---|---|---|---|---|---|---|---|
| Polyol D | 10 | 10 | 10 | 10 | 10 | 10 | 10 |
| Polyol A | 30 | 30 | 30 | 30 | 30 | 30 | 30 |
| Monol A |  |  |  |  |  |  |  |
| Monol B | 20 | 20 | 20 | 20 | 20 | 20 | 20 |
| Diol A |  |  |  |  |  |  |  |
| Triol F |  |  | 40 |  |  |  |  |
| Triol G | 40 |  |  |  |  |  |  |
| Triol H |  | 40 |  |  |  |  |  |
| Triol I |  |  |  | 40 |  |  |  |
| Triol J |  |  |  |  | 40 |  |  |
| Triol K |  |  |  |  |  | 40 |  |
| Triol L |  |  |  |  |  |  | 40 |
| Additives* | 5.53 | 5.53 | 5.53 | 5.53 | 5.53 | 5.53 | 5.53 |
| Iso A | 47.79 | 47.79 | 47.67 | 47.67 | 47.67 | 47.79 | 40.96 |
| NCO Index | 87.65 | 87.65 | 101.7 | 101.3 | 101.3 | 101.4 | 95 |

TABLE 3A-continued

| Processing Details: | | | | | | | |
|---|---|---|---|---|---|---|---|
| Settle (%) | 1.96 | 0.19 | 1.87 | 1.43 | 3.03 | 1.75 | 62.49 |
| Cell Structure | Medium | Medium | Medium | Medium | Medium | Medium | Collapse |
| Dwyer Reading (uncrushed) | 0.12 | 0.18 | 0.15 | 0.18 | 0.14 | 0.49 | |
| Dwyer Reading (Crushed) | 0.18 | 0.18 | 0.15 | 0.17 | 0.13 | 0.4 | |

*Additives include 3.8 php Water, 0.1 php Catalyst A (Niax A-1), 0.1 php Catalyst B (Niax A-33), 0.03 php Catalyst C (Dabco T-9), and 1.5 php Surfactant A (Niax L-620)
**Foam collapse in Example 18 was not expected due to the formulation of Triol L. Foam collapse may have been caused by peroxide formation in Triol L. Triol L is a commercially available product for flexible molded applications and contains low antioxidant levels (<500 ppm). In addition, Catalyst C was used to prepared foam example 18, and this catalyst could be deactivated by the presence of peroxides, resulting in foam collapse.

TABLE 3B

FREE RISE BENCH SCALE FOAM PROPERTIES

| Property (units) | Example | | | | | | |
|---|---|---|---|---|---|---|---|
| | 1 | 2 | 7 | 8 | 9 | 10 | 11 |
| Density (lb/ft$^3$) | 1.54 | 1.55 | 1.52 | 1.59 | 1.55 | 1.53 | 1.52 |
| Resilience (%) | 23 | 22 | 30 | 34 | 22 | 13 | 29 |
| Air Flow (scfpm) | 8.5 | 8.9 | 6.2 | 8.2 | 9.0 | 8.4 | 9.3 |
| IFD 25% (lb/50 in$^2$) | 10.7 | 10.4 | 15.0 | 14.8 | 10.0 | 9.0 | 11.0 |
| IFD 65% (lb/50 in$^2$) | 20.0 | 19.7 | 28.1 | 27.3 | 19.0 | 18.0 | 21.0 |
| Return Value @ 25% | 75.7 | 77.2 | 72.7 | 73.8 | 77.0 | 74.0 | 77.0 |
| S.F. 65%/25% | 1.9 | 1.9 | 1.9 | 1.8 | 1.9 | 1.9 | 1.9 |
| Tensile Str. (psi) | 10.1 | 12.0 | 8. | 10.6 | 11.4 | 11.5 | 10.6 |
| Elongation (%) | 158 | 155 | 114 | 159 | 151 | 156 | 157 |
| Tear Str. (pli) | 1.8 | 2.0 | 1.8 | 2.1 | 2.0 | 1.6 | 1.8 |
| Comp. Set 90% | 8.3 | 7.7 | 9.0 | 6.5 | 5.7 | 7.0 | 7.7 |
| HACS 75% | 9.4 | 5.7 | 8.4 | 7.9 | 4.5 | 7.7 | 13.1 |
| Wet Set 50% | 8.0 | 4.5 | 3.2 | 4.6 | 2.0 | 2.0 | 2.7 |
| 95% Ht. Recovery | <3 | <3 | <3 | <3 | <3 | <3 | <3 |

| Property (units) | Example | | | | | | |
|---|---|---|---|---|---|---|---|
| | 12 | 13 | 14 | 15 | 16 | 17 | 18 [1] |
| Density (lb/ft$^3$) | 1.57 | 1.54 | 1.55 | 1.56 | 1.53 | 1.57 | |
| Resilience (%) | 29 | 15 | 28 | 28 | 28 | 28 | |
| Air Flow (scfpm) | >9 | 8.9 | 9.2 | 8.9 | 9.4 | 4.4 | |
| IFD 25% (lb/50 in$^2$) | 6.0 | 9.0 | 11.5 | 11.4 | 8.1 | 14.0 | |
| IFD 65% (lb/50 in$^2$) | 12.0 | 18.0 | 22.0 | 21.5 | 15.7 | 27.0 | |
| Return Value @ 25% | 77.0 | 76.0 | 76.7 | 76.8 | 79.3 | 74.0 | |
| S.F. 65%/25% | 2.0 | 1.9 | 1.9 | 1.9 | 1.9 | 1.9 | |
| Tensile Str. (psi) | 12.7 | 10.4 | 11.7 | 10.8 | 9.3 | 9.7 | |
| Elongation (%) | 179 | 137 | 154 | 150 | 139 | 112 | |

TABLE 3B-continued

FREE RISE BENCH SCALE FOAM PROPERTIES

| | | | | | | |
|---|---|---|---|---|---|---|
| Tear Str. (pli) | 1.7 | 1.6 | 2.0 | 2.1 | 1.9 | 1.6 |
| Comp. Set 90% | 5.9 | 7.2 | 8.6 | 9.4 | 9.3 | 8.2 |
| HACS 75% | 8.9 | 7.8 | 5.3 | 7.7 | 14.1 | 9.0 |
| Wet Set 50% | 1.0 | 4.3 | 4.6 | 7.3 | 7.8 | 2.9 |
| 95% Ht. Recovery | 5.3 | 3.4 | <3 | <3 | <3 | <3 |

[1] no properties were measured due to foam collapse

TABLE 4A

FREE-RISE BOX MACHINE EXAMPLES - FORMULATIONS

| Example | 19 | 20 | 21 | 22 | 23 | 24 | 25 | 26 |
|---|---|---|---|---|---|---|---|---|
| Monol A | 19.8 | 9.9 | 23.1 | 9.9 | 19.8 | 19.8 | 19.8 | 19.8 |
| Triol A | 27.0 | 13.5 | 31.5 | 13.5 | 27.0 | 27.0 | 27.0 | 27.0 |
| Diol A | 13.2 | 6.6 | 15.4 | 6.6 | 13.2 | 13.2 | 13.2 | 13.2 |
| Polyol A | 30.0 | 60.0 | 20.0 | 60.0 | 30.0 | 30.0 | 30.0 | 30.0 |
| Polyol D | | | | | 10.0 | 10.0 | 10.0 | 10.0 |
| Polyol E | 10.0 | 10.0 | | | | | | |
| Polyol H | | | 10.0 | 10.0 | 10.0 | | | |
| Water | 4.00 | 4.00 | 3.80 | 3.80 | 3.60 | 3.60 | 3.80 | 2.50 |
| Surfactant B | 1.70 | 1.70 | 1.70 | 1.70 | 1.70 | | | |
| Surfactant A | | | | | | 1.50 | 1.50 | 1.50 |
| Antioxidant A | | | | 0.15 | 0.15 | 0.15 | 0.15 | 0.15 |
| Catalyst B | 0.07 | 0.07 | 0.07 | 0.12 | 0.40 | 0.40 | 0.60 | 0.60 |
| Catalyst A | 0.07 | 0.07 | 0.07 | 0.04 | | | | 0.10 |
| Catalyst C | 0.05 | 0.05 | 0.09 | 0.05 | 0.10 | | | 0.05 |
| Iso A | 49.42 | 45.75 | 49.86 | 45.36 | 46.12 | 45.78 | | |
| Iso B | | | | | | | 66.77 | 50.56 |
| NCO Index | 95 | 95 | 97 | 98 | 95.2 | 95 | 89 | 89.5 |

TABLE 4B

FREE-RISE BOX MACHINE EXAMPLES - AVERAGE PHYSICAL TESTING DETAILS

| Property | Example | | | | | | | |
|---|---|---|---|---|---|---|---|---|
| (units) | 19 | 20 | 21 | 22 | 23 | 24 | 25 | 26 |
| Density (lb/ft$^3$) | 1.38 | 1.49 | 1.54 | 1.53 | 1.58 | 1.47 | 1.70 | 2.42 |
| Resilience (%) | 30.0 | 32.0 | 27.0 | 36.0 | 27.0 | 24.0 | 16.0 | 3.0 |
| Air Flow (scfpm) | >9 | 6.03 | 8.41 | >9 | 9.19 | 9.49 | 8.71 | 5.44 |
| IFD Ht. (in.) | 4.01 | 4.03 | 4.02 | 4.03 | 4.02 | 4.04 | 4.06 | 4.10 |
| IFD 25% (lb/50 in$^2$) | 8.39 | 18.52 | 14.34 | 15.48 | 9.72 | 8.25 | 5.00 | 3.73 |
| IFD 65% (lb/50 in$^2$) | 20.03 | 40.90 | 30.33 | 31.63 | 19.99 | 17.81 | 13.73 | 9.42 |
| Ret. Val. @ 25% | 70.46 | 70.51 | 69.09 | 72.13 | 74.81 | 78.30 | 57.31 | 85.20 |
| S.F. 65%/25% | 2.39 | 2.21 | 2.11 | 2.04 | 2.06 | 2.16 | 2.75 | 2.52 |
| Tensile Str. (psi) | 8.01 | 8.75 | 9.69 | 12.86 | 9.35 | 10.56 | 13.82 | 11.17 |
| Elongation (%) | 181 | 143 | 153 | 213 | 325 | 228 | 133 | 167 |
| Tear Str. (pli) | 1.62 | 2.16 | 1.87 | 2.68 | 2.21 | 2.46 | 1.99 | 1.58 |
| Comp. Set 50% | nm[1] | nm[1] | 17.33 | nm[1] | 8.79 | 9.10 | 27.91 | 5.95 |
| Comp. Set 90% | 21.1 | 6.7 | nm[1] | 6.7 | 4.4 | 5.3 | nm[1] | nm[1] |
| HACS 75% | 20.4 | 16.1 | 13.8 | 7.3 | 7.6 | 18.8 | 27.5 | 6.1 |
| Wet Set 50% | 9.5 | 7.1 | 8.6 | 8.4 | 4.1 | 7.3 | 4.3 | 3.5 |
| 95% Ht. Recovery | nm[1] | nm[1] | <3 | <3 | <3 | nm[1] | >60 | 6.00 |
| MVSS 302 Burn | nm[1] | 107.9 | nm[1] | nm[1] | nm[1] | nm[1] | nm[1] | nm[1] |

[1] not measured

TABLE 5A

CONTINUOUS MACHINE (MAXFOAM) EXAMPLES - FORMULATIONS

| | Example | | | |
|---|---|---|---|---|
| | 27 | 28 | 29 | 30 |
| Monol A | 19.8 | 19.8 | 19.8 | 19.8 |
| Triol A | 27.0 | 27.0 | 27.0 | 27.0 |
| Diol A | 13.2 | 13.2 | 13.2 | 13.2 |
| Polyol A | 30.0 | 30.0 | 30.0 | 30.0 |
| Polyol D | 10.0 | 10.0 | 10.0 | 10.0 |
| Foam Modifier 1 | | | | 2.0 |
| Water | 3.60 | 3.60 | 3.40 | 3.60 |
| Surfactant A | 1.50 | 1.50 | 1.50 | 1.50 |
| Antioxidant A | 0.15 | 0.15 | 0.15 | 0.15 |
| Catalyst B | 0.40 | 0.40 | 0.40 | 0.40 |
| Catalyst C | 0.02 | | | |
| Iso A | 46.10 | 46.10 | 48.93 | 49.77 |
| NCO Index | 95.00 | 95.00 | 105.00 | 95.00 |

TABLE 5B

CONTINUOUS MACHINE (MAXFOAM) EXAMPLES - AVERAGE PHYSICAL TESTING DETAILS

| Property (units) | Example | | | |
|---|---|---|---|---|
| | 27 | 28 | 29 | 30 |
| Density (lb/ft$^3$) | 1.53 | 1.51 | 1.59 | 1.57 |
| Resilience (%) | 18.00 | 22.00 | 19.00 | 16.00 |
| Air Flow (scfpm) | 6.14 | 8.49 | 8.55 | 9.12 |
| IFD Ht. (in.) | 4.04 | 4.02 | 3.98 | 4.03 |
| IFD 25% (lb/50 in$^2$) | 8.36 | 7.00 | 8.07 | 5.87 |
| IFD 65% (lb/50 in$^2$) | 17.39 | 15.24 | 19.09 | 13.37 |
| Ret. Val. @ 25% | 78.93 | 79.10 | 79.30 | 77.86 |
| S.F. 65%/25% | 2.08 | 2.18 | 2.36 | 2.28 |
| Tensile Str. (psi) | 11.30 | 11.17 | 12.48 | 11.12 |
| Elongation (%) | 198 | 187 | 151 | 197 |
| Tear Str. (pli) | 1.68 | 1.97 | 2.05 | 2.10 |
| Comp. Set 50% | 8.70 | 6.66 | 12.52 | 9.66 |
| Comp. Set 90% | 13.9 | 5.5 | 13.0 | 12.6 |
| HACS 75% | 10.2 | 7.3 | 15.2 | 14.5 |
| Wet Set 50% | 7.4 | 11.0 | 7.9 | 6.7 |
| 95% Ht. Recovery | <3 | <3 | 3.80 | 3.80 |
| MVSS 302 Burn | 0.0 | 67.0 | 30.2 | 0.0 |

TABLE 6A

BENCH SCALE FREE-RISE FOAMS MADE WITH MDI - FORMULATIONS AND PROCESSING

| Example | 31 | 32 | 33 | 34 | 35 | 36 |
|---|---|---|---|---|---|---|
| Monol A | 8.25 | 13.86 | 12.54 | 14.52 | 13.86 | 13.86 |
| Triol A | 11.25 | 18.90 | 17.10 | 19.80 | 18.90 | 18.90 |
| Diol A | 5.50 | 9.24 | 8.36 | 9.68 | 9.24 | 9.24 |
| Polyol A | 60.00 | 48.00 | 42.00 | 51.00 | 48.00 | 48.00 |
| Polyol D | 15.00 | 10.00 | 20.00 | 5.00 | | |
| Polyol G | | | | | 10.00 | |
| Polyol H | | | | | | 10.00 |
| Water | 3.60 | 3.40 | 3.40 | 3.40 | 3.40 | 3.40 |
| Surfactant A | 1.50 | 1.50 | 1.50 | 1.50 | 1.50 | 1.50 |
| Catalyst B | | 0.13 | 0.13 | 0.13 | 0.13 | 0.13 |
| Catalyst A | 0.20 | 0.13 | 0.13 | 0.13 | 0.13 | 0.13 |
| Catalyst C | 0.03 | 0.03 | 0.03 | 0.03 | 0.03 | 0.03 |
| Iso D | 58.17 | 58.63 | 57.92 | 58.98 | 58.31 | 65.01 |
| NCO Index | 90.00 | 90.00 | 90.00 | 90.00 | 90.00 | 100.00 |
| Processing Details | | | | | | |
| Settle (%) | 5.82 | 2.81 | 3.31 | 4.15 | 1.56 | 2.49 |
| Proc. Char. | Good | Good | Good | Good | Good | Good |
| Shrinkage | nm[1] | Nil | Nil | Nil | Nil | Nil |
| Cell Structure | Medium | Medium | Slight coarse | Medium | Medium | Slight coarse |

[1] not measured

TABLE 6B

BENCH SCALE FREE-RISE FOAMS MADE WITH MDI - AVERAGE PHYSICAL TESTING DETAILS

| Property (units) | Example | | | | | |
|---|---|---|---|---|---|---|
| | 31 | 32 | 33 | 34 | 35 | 36 |
| Density (lb/ft$^3$) | 1.95 | 2.07 | 2.10 | 2.04 | 2.05 | 2.00 |
| Resilience (%) | 23 | 17 | 20 | 24 | 21 | 15 |
| Air Flow (scfpm) | 6.2 | 8.7 | 8.7 | 8.6 | 8.3 | 6.3 |
| IFD 25% (lb/50 in$^2$) | 14.5 | 8.6 | 9.4 | 11.4 | 13.1 | 8.4 |
| IFD 65% (lb/50 in$^2$) | 32.4 | 20.2 | 23.3 | 24.0 | 27.8 | 21.0 |
| Ret. Val. @ 25% | 83.1 | 86.4 | 82.2 | 85.8 | 82.9 | 81.2 |
| S.F. 65%/25% | 2.23 | 2.35 | 2.48 | 2.10 | 2.13 | 2.50 |
| Tensile Str. (psi) | 8.8 | 9.9 | 9.8 | 9.7 | 8.0 | 7.5 |
| Elongation (%) | 61.7 | 94.4 | 76.3 | 90.0 | 68.6 | 52.1 |
| Tear Str. (pli) | 1.1 | 1.3 | 1.2 | 1.3 | 1.0 | 1.2 |
| Comp. Set 90% | 2.4 | 1.7 | 2.5 | 10.2 | 9.5 | 9.5 |
| HACS 75% | nm[1] | 3.5 | 4.9 | 6.9 | 9.9 | 2.4 |
| Wet Set 50% | nm[1] | 2.6 | 2.4 | 2.9 | 4.3 | 6.7 |

[1] not measured

TABLE 7A

BENCH SCALE FREE-RISE EXAMPLES OF FAST RECOVERY FOAMS MADE WITH TDI - FORMULATIONS

| Example | 37 | 38 | 39 | 40 | 41 | 42 |
|---|---|---|---|---|---|---|
| Monol A | 9.9 | 14.9 | 19.8 | 26.4 | 21.5 | 16.5 |
| Triol A | 13.5 | 20.3 | 27.0 | 36.0 | 29.3 | 22.5 |
| Diol A | 6.6 | 9.9 | 13.2 | 17.6 | 14.3 | 11.0 |
| Polyol A | 60.0 | 45.0 | 30.0 | 20.0 | 30.0 | 35.0 |
| Polyol E | 10.0 | 10.0 | 10.0 | | 5.0 | |
| Polyol G | | | | | | 15.0 |
| Polyol D | | | | | | |
| Water | 4.20 | 4.20 | 4.20 | 3.80 | 4.20 | 4.20 |
| Surfactant A | 1.50 | 1.50 | 1.50 | 1.50 | 1.50 | 1.50 |
| Catalyst B | 0.10 | 0.10 | 0.10 | 0.10 | 0.10 | 0.09 |
| Catalyst A | 0.10 | 0.10 | 0.10 | 0.10 | 0.10 | 0.0 |

TABLE 7A-continued

BENCH SCALE FREE-RISE EXAMPLES OF FAST RECOVERY FOAMS MADE WITH TDI - FORMULATIONS

| Example | 37 | 38 | 39 | 40 | 41 | 42 |
|---|---|---|---|---|---|---|
| Catalyst C | 0.05 | 0.05 | 0.05 | 0.05 | 0.05 | 0.03 |
| Iso A | 47.6 | 49.5 | 51.3 | 50.2 | 52.0 | 46.5 |
| NCO Index | 95.0 | 95.0 | 95.0 | 95.0 | 95.0 | 95.0 |
| Processing Details | | | | | | |
| Settle (%) | 2.12 | 4.05 | 3.17 | 2.01 | 2.34 | 0.52 |
| Proc. Char. | Good | Good | Good | Good | Good | Good |
| Cell Structure | Medium | Medium | Medium | Medium | Medium | Medium |

TABLE 7B

BENCH SCALE FREE-RISE EXAMPLES OF FAST RECOVERY FOAMS MADE WITH TDI - AVERAGE PHYSICAL TESTING DETAILS

| Property (units) | 37 | 38 | 39 | 40 | 41 | 42 |
|---|---|---|---|---|---|---|
| Density (lb/ft$^3$) | 1.48 | 1.53 | 1.43 | 1.49 | 1.44 | 1.74 |
| Resilience (%) | 36 | 27 | 25 | 25 | 24 | 23 |
| Air Flow (scfpm) | >9 | 8.06 | >9 | 8.07 | >9 | 8.47 |
| IFD Height (in.) | 4.07 | 4.14 | 4.1 | 4.05 | 5.1 | 4.04 |
| IFD 25% (lb/50 in$^2$) | 12.7 | 10.5 | 9.4 | 9.3 | 10.5 | 14.0 |
| IFD 65% (lb/50 in$^2$) | 25.3 | 22.0 | 19.6 | 17.5 | 21.2 | 27.1 |
| Ret. Val. @ 25% | 73.9 | 73.9 | 68.2 | 74.4 | 68.8 | 76.4 |
| S.F. 65%/25% | 1.99 | 2.1 | 2.09 | 1.89 | 2.03 | 1.94 |
| Tensile Str. (psi) | 22.8 | 18.8 | 15.3 | 11.9 | 13.7 | 7.9 |
| Elongation (%) | 297 | 167 | 143 | 184 | 178 | 93 |
| Tear Str. (pli) | 2.4 | 1.6 | 1.9 | 1.6 | 1.9 | 2.2 |
| Comp. Set 50% | nm[1] | nm[1] | nm[1] | 12.1 | nm[1] | 9.1 |
| Comp. Set 90% | 7.3 | 9.7 | 16.4 | nm[1] | 13.6 | nm[1] |
| HACS 75% | 11.4 | 21.6 | 13.3 | 10.9 | 14.3 | 6.1 |
| Wet Set 50% | 4.1 | 6.0 | 8.3 | 3.7 | 6.1 | 4.0 |

[1] not measured

TABLE 8A

BENCH SCALE FREE-RISE EXAMPLES OF FAST RECOVERY FOAMS MADE WITH TDI - FORMULATIONS

| Example | 43 | 44 | 45 | 46 | 47 | 48 |
|---|---|---|---|---|---|---|
| Monol A | 9.9 | 9.9 | 18.8 | 11.6 | 21.5 | 19.8 |
| Triol A | 13.5 | 13.5 | 25.7 | 15.8 | 29.3 | 27.0 |
| Diol A | 6.6 | 6.6 | 12.5 | 7.7 | 14.3 | 13.2 |
| Polyol A | 60.0 | 60.0 | 25.0 | 35.0 | 25.0 | 30.0 |
| Polyol E | | | | | 10.0 | |
| Polyol D | 10.0 | | | | | 10.0 |
| Polyol F | | 10.0 | | | | |
| Polyol G | | | 18.0 | 30.0 | | |
| Water | 4.20 | 4.20 | 3.80 | 3.80 | 3.00 | 2.00 |
| Surfactant A | 1.50 | 1.50 | 1.50 | 1.50 | 1.50 | 1.50 |
| Catalyst B | 0.10 | 0.10 | | | 0.13 | 0.50 |
| Catalyst A | 0.10 | 0.10 | 0.13 | 0.13 | 0.13 | |
| Catalyst C | 0.05 | 0.05 | 0.03 | 0.03 | 0.05 | |
| Iso A | 47.7 | 47.6 | 46.9 | 46.2 | 40.9 | 31.5 |
| NCO Index | 95.0 | 95.0 | 95.0 | 100.0 | 95.0 | 95.0 |
| Processing Details | | | | | | |
| Settle (%) | 1.86 | 4.08 | 1.21 | 1.87 | 5.73 | 0.05 |
| Proc. Char. | Good | Good | Good | Good | Good | Good |
| Cell Structure | Slight coarse | Slight coarse | Medium | Medium | Fine | Medium |

TABLE 8B

BENCH SCALE FREE-RISE EXAMPLES OF FAST RECOVERY FOAMS MADE WITH TDI - AVERAGE PHYSICAL TESTING PROPERTIES

| Property (units) | 43 | 44 | 45 | 46 | 47 | 48 |
|---|---|---|---|---|---|---|
| Density (lb/ft$^3$) | 1.51 | 1.53 | 1.55 | 1.52 | 1.9 | 2.59 |
| Resilience (%) | 25 | 35 | 22 | 26 | 28 | 27 |
| Air Flow (scfpm) | >9 | >9 | 7.6 | 6.42 | 8.62 | 7.1 |
| IFD Height (in.) | 4.169 | 4.11 | 4.08 | 4.06 | 4.1 | 4.07 |
| IFD 25% (lb/50 in$^2$) | 14.5 | 12.6 | 12.8 | 15.5 | 5.0 | 8.1 |
| IFD 65% (lb/50 in$^2$) | 27.3 | 25.1 | 25.0 | 32.3 | 11.4 | 17.2 |
| Ret. Val. @ 25% | 72.5 | 74.1 | 68.8 | 69.4 | 77.8 | 87.5 |
| S.F. 65%/25% | 1.88 | 1.99 | 1.95 | 2.08 | 2.28 | 2.12 |
| Tensile Str. (psi) | 18.2 | 15.4 | 10.7 | 6.2 | 9.0 | 7.9 |
| Elongation (%) | 226 | 286 | 110 | 24 | 151 | 151 |
| Tear Str. (pli) | 2.2 | 2.5 | 1.7 | 0.9 | 1.6 | 2.1 |
| Comp. Set 50% | nm[1] | nm[1] | 13.4 | 13.8 | 17.8 | nm[1] |
| Comp. Set 90% | 5.0 | 8.3 | nm[1] | nm[1] | nm[1] | 7.0 |
| HACS 75% | 6.2 | 8.6 | 17.3 | 19.7 | 16.3 | 3.0 |
| Wet Set 50% | 2.6 | 2.9 | 20.0 | 6.1 | 4.2 | 3.1 |

[1] not measured

TABLE 9A

BENCH SCALE FREE-RISE EXAMPLES OF FAST RECOVERY FOAMS MADE WITH TDI - FORMULATIONS

| Example | 49 | 50 | 51 | 52 | 53 | 54 |
|---|---|---|---|---|---|---|
| Monol A | 19.8 | 18.2 | 16.5 | 19.8 | 19.8 | 19.8 |
| Triol A | 27.0 | 24.8 | 22.5 | 27.0 | 27.0 | 27.0 |
| Diol A | 13.2 | 12.1 | 11.0 | 13.2 | 13.2 | 13.2 |
| Polyol A | 30.0 | 35.0 | 35.0 | 30.0 | 30.0 | 30.0 |
| Polyol E | 10.0 | | | | | |
| Polyol D | | 10.0 | 15.0 | 10.0 | 10.0 | 10.0 |

TABLE 9A-continued

BENCH SCALE FREE-RISE EXAMPLES OF FAST RECOVERY FOAMS MADE WITH TDI - FORMULATIONS

| Example | 49 | 50 | 51 | 52 | 53 | 54 |
|---|---|---|---|---|---|---|
| Water | 3.80 | 4.20 | 3.80 | 3.60 | 3.60 | 3.60 |
| Methylene chloride | 7.00 | | | | | |
| Surfactant A | 1.50 | 1.50 | 1.50 | | | |
| Surfactant B | | | | 1.50 | 2.00 | 1.00 |
| Catalyst B | 0.10 | 0.19 | 0.09 | 0.40 | 0.30 | 0.30 |
| Catalyst A | 0.10 | 0.06 | 0.09 | | | |
| Catalyst C | 0.10 | 0.12 | 0.03 | | 0.10 | 0.10 |
| Iso A | 48.2 | 42.8 | 51.4 | 46.1 | 46.0 | 46.0 |
| NCO Index | 95.0 | 80.0 | 105.0 | 95.0 | 95.0 | 95.0 |
| Processing Details | | | | | | |
| Settle (%) | 21.67 | 1.23 | 0.35 | nm[1] | 1.16 | 1.28 |
| Proc. Char. | Good | Good | Good | Good | Good | Good |
| Cell Structure | Fine | Fine | Fine | Medium | Medium | Medium |

[1]not measured

TABLE 9B

BENCH SCALE FREE-RISE EXAMPLES OF FAST RECOVERY FOAMS MADE WITH TDI - AVERAGE PHYSICAL TESTING DETAILS

| Property (units) | 49 | 50 | 51 | 52 | 53 | 54 |
|---|---|---|---|---|---|---|
| Density (lb/ft$^3$) | 1.3 | 1.59 | 1.63 | 1.55 | 1.4 | 1.41 |
| Resilience (%) | 24 | 25 | 22 | 22 | 23 | 22 |
| Air Flow (scfpm) | 9.35 | 8.37 | 7.24 | 9.43 | 8.39 | 8.65 |
| IFD Height (in.) | 4.08 | 4.07 | 4.06 | 4.11 | 4.11 | 4.09 |
| IFD 25% (lb/50 in$^2$) | 6.1 | 10.2 | 13.0 | 5.9 | 8.6 | 8.9 |
| IFD 65% (lb/50 in$^2$) | 12.2 | 20.0 | 25.5 | 12.0 | 15.6 | 16.2 |
| Ret. Val. @ 25% | 71.3 | 73.3 | 74.1 | 76.1 | 74.5 | 74.9 |
| S.F. 65%/25% | 1.98 | 1.97 | 1.96 | 2.04 | 1.81 | 1.81 |
| Tensile Str. (psi) | nm[1] | 9.9 | 9.2 | 9.8 | 10.4 | 8.8 |
| Elongation (%) | 204 | 232 | 112 | 188 | 217 | 178 |
| Tear Str. (pli) | 1.6 | 2.1 | 2.2 | 1.6 | 1.8 | 1.6 |
| Comp. Set 50% | 14.5 | 8.8 | 13.6 | nm[1] | nm[1] | nm[1] |
| Comp. Set 90% | nm[1] | nm[1] | nm[1] | 9.0 | 6.3 | 7.6 |
| HACS 75% | 21.2 | 8.1 | 5.9 | 12.5 | 11.8 | 8.4 |
| Wet Set 50% | 10.2 | 5.9 | 2.5 | 6.2 | 4.6 | 9.4 |

[1]not measured

TABLE 10A

BENCH SCALE FREE-RISE EXAMPLES OF VISCOELASTIC FOAM - FORMULATIONS

| Example | 55 | 56 | 57 | 58 | 59 | 60 |
|---|---|---|---|---|---|---|
| Monol A | 19.80 | 18.81 | 19.80 | 21.45 | 21.45 | 28.71 |
| Triol A | 27.00 | 25.65 | 27.00 | 29.25 | 29.25 | 39.15 |
| Diol A | 13.20 | 12.54 | 13.20 | 14.30 | 14.30 | 19.14 |
| Polyol A | 30.00 | 25.00 | 30.00 | 25.00 | 25.00 | |
| Polyol B | | | | | | 3.00 |
| Polyol E | 10.00 | | | | | 10.00 |
| Polyol D | | | 10.00 | 10.00 | | 10.00 |
| Polyol G | | 18.00 | | | | |
| Water | 3.80 | 3.80 | 3.80 | 3.80 | 3.80 | 3.60 |
| Methylene Chloride | 7.00 | | | | | |
| Surfactant A | 1.50 | 1.50 | | 1.50 | 1.50 | 1.50 |
| Surfactant C | | | 1.50 | | | |
| Catalyst B | 0.10 | | 0.50 | 0.50 | 0.50 | 0.08 |
| Catalyst A | 0.10 | 0.13 | | | | 0.08 |
| Catalyst C | 0.10 | 0.03 | | | | 0.05 |
| Iso A | 50.73 | 49.34 | 48.02 | 48.64 | 48.52 | 49.75 |
| NCO Index | 100.00 | 100.00 | 95.00 | 95.00 | 95.00 | 95.00 |
| Processing Details | | | | | | |
| Settle (%) | 3.93 | 1.15 | 2.09 | 1.35 | 4.53 | 1.45 |
| Proc. Char. | Good | Good | Good | Good | Good | Good |
| Cell Structure | Medium | Medium | Medium | Slight Coarse | Slight Coarse | Medium |

TABLE 10B

BENCH SCALE FREE-RISE EXAMPLES OF VISCOELASTIC FOAM - AVERAGE PHYSICAL TESTING DETAILS

| Property (units) | 55 | 56 | 57 | 58 | 59 | 60 |
|---|---|---|---|---|---|---|
| Density (lb/ft$^3$) | 1.28 | 1.51 | 1.49 | 1.48 | 1.57 | 1.68 |
| Resilience (%) | 24 | 20 | 17 | 18 | 23 | 12 |
| Air Flow (scfpm) | 9.2 | 6.7 | 9.2 | 9.1 | 9.0 | 9.0 |
| IFD 25% (lb/50 in$^2$) | 7.1 | 14.5 | 7.2 | 7.6 | 5.1 | 8.8 |
| IFD 65% (lb/50 in$^2$) | 14.3 | 28.3 | 14.6 | 15.7 | 12.2 | 18.5 |
| Ret. Val. @ 25% | 70.7 | 65.5 | 71.7 | 67.9 | 66.9 | 69.9 |
| S.F. 65%/25% | 2.02 | 1.95 | 2.02 | 2.07 | 2.4 | 2.09 |
| Tensile Str. (psi) | 7.4 | 10.4 | 8.8 | 12.2 | 11.1 | 9.8 |
| Elongation (%) | 118 | 89 | 198 | 185 | 163 | 110 |
| Tear Str. (pli) | 1.5 | 1.8 | 2.0 | 1.6 | 1.3 | 1.5 |
| Comp. Set 50% | 23.4 | 26.9 | 8.6 | 25.3 | 37.6 | nm[1] |
| Comp. Set 90% | nm[1] | nm[1] | nm[1] | nm[1] | nm[1] | 31.9 |
| HACS 75% | 24.8 | 19.6 | 26.4 | 19.7 | 28.3 | 145.9 |
| Wet Set 50% | 7.7 | 12.1 | 3.9 | 2.9 | 3.5 | 8.0 |
| 95% Ht. Recovery | 5.1 | 5.8 | 5.6 | 11.0 | 23.0 | 13.0 |

[1]not measured

TABLE 11A

BENCH SCALE FREE-RISE EXAMPLES OF VISCOELASTIC FOAM - FORMULATIONS

| Example | 61 | 62 | 63 | 64 | 65 | 66 |
|---|---|---|---|---|---|---|
| Monol A | 31.35 | 30.53 | 19.80 | 19.80 | 19.80 | 17.16 |
| Triol A | 42.75 | 41.63 | 27.00 | 27.00 | 27.00 | 23.40 |
| Diol A | 20.90 | 20.35 | 13.20 | 13.20 | 13.20 | 11.44 |
| Polyol A | | | 30.00 | 30.00 | 30.00 | 30.00 |
| Polyol C | 5.00 | 7.50 | | | | |
| Polyol D | | | 10.00 | 10.00 | 10.00 | |
| Polyol G | | | | | | 18.00 |
| Water | 3.60 | 3.60 | 3.80 | 3.80 | 3.80 | 3.80 |
| Surfactant A | 1.50 | 1.50 | 1.50 | 1.50 | 1.50 | 1.50 |
| Catalyst B | 0.10 | 0.10 | 0.40 | 0.50 | 0.60 | 0.20 |
| Catalyst A | 0.10 | 0.10 | | | | 0.20 |
| Catalyst C | 0.03 | 0.03 | | | | |
| Iso A | 50.66 | 50.59 | 52.98 | | | |
| Iso E | | | | 59.84 | | |
| Iso D | | | | | 67.31 | |
| Iso B | | | | | | 57.95 |
| NCO Index | 95.00 | 95.00 | 105.00 | 80.00 | 90.00 | 80.00 |

Processing Details

| | | | | | | |
|---|---|---|---|---|---|---|
| Settle (%) | 1.02 | 4.78 | 0.39 | 1.09 | 2.04 | 2.71 |
| Proc. Char. | Good | Good | Good | Good | Good | Good |
| Cell Structure | Medium | Fine | Slight coarse | Fine | Fine | Fine |

TABLE 11B

BENCH SCALE FREE-RISE EXAMPLES OF VISCOELASTIC FOAM - AVERAGE PHYSICAL TESTING DETAILS

| Property (units) | 61 | 62 | 63 | 64 | 65 | 66 |
|---|---|---|---|---|---|---|
| Density (lb/ft$^3$) | 1.59 | 1.55 | 1.55 | 1.95 | 1.78 | 1.77 |
| Resilience (%) | 11 | 14 | 20 | 13 | 13 | 15 |
| Air Flow (scfpm) | 9.0 | 7.1 | .9 | 6.8 | 6.6 | 6.8 |
| IFD 25% (lb/50 in$^2$) | 6.6 | 4.9 | 7.0 | 5.3 | 10.6 | 5.5 |
| IFD 65% (lb/50 in$^2$) | 14.1 | 10.6 | 15.8 | 14.0 | 23.1 | 12.5 |
| Ret. Val. @ 25% | 65.5 | 62.5 | 63.5 | 79.9 | 68.8 | 61.4 |
| S.F. 65%/25% | 2.14 | 2.15 | 2.25 | 2.65 | 2.18 | 2.27 |
| Tensile Str. (psi) | 7.1 | 9.4 | 10.8 | 5.0 | 13.5 | 9.1 |
| Elongation (%) | 75 | 49 | 98 | 96 | 102 | 115 |
| Tear Str. (pli) | 1.2 | 1.1 | 2.1 | 1.1 | 1.3 | 1.4 |
| Comp. Set 50% | nm$^{(1)}$ | 27.9 | nm$^{(1)}$ | nm$^{(1)}$ | nm$^{(1)}$ | nm$^{(1)}$ |
| Comp. Set 90% | 20.3 | nm$^{(1)}$ | 56.3 | 11.6 | 7.0 | 88.8 |
| HACS 75% | 15.0 | 14.2 | 63.2 | 10.8 | 8.6 | 45.1 |
| Wet Set 50% | 4.9 | 10.4 | 5.1 | 5.3 | 2.3 | 3.5 |
| 95% Ht. Recovery | 16.0 | 56.0 | 18.0 | 7.0 | 12.0 | 32.0 |

$^{(1)}$not measured

TABLE 12A

EXAMPLES OF HYDROPHILIC FOAM FORMULATIONS

| Example | 67 | 68 | 69 | 70 |
|---|---|---|---|---|
| Monol A | 6.60 | 13.20 | 8.25 | 8.25 |
| Triol A | 9.00 | 18.00 | 11.25 | 11.25 |
| Diol A | 4.40 | 8.80 | 5.50 | 5.50 |
| Polyol A | 70.00 | 50.00 | 60.00 | 60.00 |
| Polyol D | | | 15.00 | 15.00 |
| Polyol H | 10.00 | 10.00 | | |
| Water | 4.20 | 4.20 | 4.10 | 4.10 |
| Surfactant A | 1.50 | 1.50 | 1.50 | 1.50 |
| Catalyst B | 0.10 | 0.23 | 0.20 | |
| Catalyst A | 0.10 | 0.08 | 0.20 | 0.18 |
| Catalyst C | | | 0.03 | 0.03 |
| Iso D | | | 57.61 | |
| Iso C | | | | 59.02 |
| Iso A | 46.43 | 48.98 | | |
| NCO Index | 95.00 | 95.00 | 80.00 | 80.00 |

Processing Details

| | | | | |
|---|---|---|---|---|
| Settle (%) | 2.71 | 2.70 | 7.75 | 4.33 |
| Cell Structure | Slight coarse | Medium | Medium | Medium |

TABLE 12B

EXAMPLES OF HYDROPHILIC FOAMS - AVERAGE PHYSICAL TESTING DETAILS

| Property (units) | 67 | 68 | 69 | 70 |
|---|---|---|---|---|
| Density (lb/ft$^3$) | 1.59 | 1.57 | 1.82 | 2.09 |
| Resilience (%) | 32.00 | 27.00 | 20.00 | 18.00 |
| Air Flow (scfpm) | >9 | >9 | 5.63 | 5.34 |
| IFD Height | 3.99 | 4.09 | 4.05 | 4.05 |
| IFD 25% (lb/50 in$^2$) | 13.03 | 10.25 | 13.70 | 18.04 |
| IFD 65% (lb/50 in$^2$) | 25.99 | 21.88 | 28.34 | 40.81 |
| Ret. Val. @ 25% | 74 | 66.52 | 81.48 | 66 |
| S.F. 65%/25% | 1.99 | 2.13 | 2.07 | 2.26 |
| Tensile Str. (psi) | 15.54 | 14.83 | 7.547 | 15.77 |
| Elongation (%) | 308.3 | 261.9 | 59.89 | 67.75 |
| Tear Str. (pli) | 2.197 | 1.85 | 1.047 | 1.663 |
| Comp. Set 50% | 2 | nm$^{(1)}$ | nm$^{(1)}$ | nm$^{(1)}$ |
| Comp. Set 90% | 8.643 | 13.91 | 4.477 | 12.91 |
| HACS 75% | 21.32 | 25.19 | 6.597 | 10.51 |
| Wet Set 50% | 6.22 | 7.947 | 5.16 | 10.18 |
| Drop Penetration Time (s) (Dry) | 3.00 | 4.00 | 2.50 | 2.50 |
| 100% Submerge Time (s) (Dry) | 30.00 | 40.00 | 8.00 | 25.00 |
| 100% Submerge Time (s) (wet) | 2.00 | 2.00 | 5.00 | 3.00 |

$^{(1)}$not measured

TABLE 13A

BENCH SCALE FREE-RISE EXAMPLES OF FAST RECOVERY FOAMS - FORMULATIONS

| Example | 71 | 72 |
|---|---|---|
| Monol A | | 13.2 |
| Triol A | | 18 |
| Diol A | | 8.8 |
| Polyol D | 10 | 10 |

TABLE 13A-continued

BENCH SCALE FREE-RISE EXAMPLES OF FAST RECOVERY FOAMS - FORMULATIONS

| | Example | |
|---|---|---|
| | 71 | 72 |
| Polyol A | 30 | |
| Polyol I | | 50 |
| Monol D | 20 | |
| Triol B | 40 | |
| *Additives | 5.53 | |
| **Additives | | 5.14 |
| Iso A | 47.67 | |
| Iso D | | 59.34 |
| NCO Index | 95 | 90.0 |
| Processing Details: | | |
| Cream Time (s) | 10 | 11 |
| Rise Time (secs) | | 141 |
| Settle (%) | 1.88 | 1.07 |
| Cell Structure | Slightly coarse | Medium |
| Dwyer reading (uncrushed) | 0.53 | 0.22 |
| Dwyer reading (crushed) | 0.42 | 0.22 |

*Additives include 3.8 php water, 0.1 php Catalyst A (Niax A-1), 0.1 php Catalyst B (Niax A-33), 0.03 php Catalyst C (Dabco T-9), and 1.5 php Surfactant A (Niax L-620)
**Additives include 3.4 php water, 0.1 php Catalyst A (Niax A-1), 0.1 php Catalyst B (Niax A-33), 0.04 php Catalyst C (Dabco T-9), and 1.5 php Surfactant A (Niax L-620)

TABLE 13B

BENCH SCALE FREE-RISE EXAMPLES OF FAST RECOVERY FOAMS - TEST DETAILS

| | Example | |
|---|---|---|
| Property (units) | 71 | 72 |
| Density (lb/ft$^3$) | 1.6 | 1.92 |
| Resilience (%) | 21 | 18 |
| Air Flow (scfpm) | 4.2 | 7.3 |
| IFD 25% (lb/50 in$^2$) | 12.1 | 11.2 |
| IFD 65% (lb/50 in$^2$) | 23.7 | 24.2 |
| Ret. Val. @ 25% | 75.6 | 83.8 |
| S.F. 65%/25% | 2.0 | 2.2 |
| Tensile Str. (psi) | 6.9 | 9.9 |
| Elongation (%) | 79 | 84 |
| Tear Str. (pli) | 1.2 | 1.3 |
| Comp. Set 90% | 7.6 | 1.6 |
| HACS 75% | 5.6 | 1.7 |
| Wet Set 50% | 9.8 | 5.1 |
| 95% Height Recovery Time (secs) | <3 | 1.9 |

TABLE 14A

COMPARATIVE EXAMPLES 73-76 - FORMULATIONS

| | Example | | | |
|---|---|---|---|---|
| | 73 | 74 | 75 | 76 |
| Polyol A | 30 | 30 | 30 | 30 |
| Polyol D | 10 | 10 | 10 | 10 |
| Monol B | 20 | 20 | 20 | 20 |
| Polyol J | | 40 | | |
| Polyol K | | | 40 | |
| Polyol L | 40 | | | |
| TRIOL M | | | | 20 |
| TRIOL N | | | | 20 |
| Water (distilled) | 3.8 | 3.8 | 3.8 | 3.8 |
| Surfactant A | 1.5 | 1.5 | 1.5 | 1.5 |
| Catalyst A | 0.1 | 0.1 | 0.1 | 0.1 |
| Catalyst B | 0.1 | 0.1 | 0.1 | 0.1 |
| Catalyst C | 0.03 | 0.03 | 0.03 | 0.03 |
| Iso A | 47.67 | 47.67 | 47.67 | 47.67 |
| NCO Index | 110.6 | 111.1 | 110.6 | 112.3 |
| Processing Details: | | | | |
| Cream Time (s) | 9 | 9 | 9 | 10 |
| Final Height (in) | 1.51 | 1.17 | 1.33 | 5.68 |
| Settle (%) | 80.7 | 85.42 | 83.13 | 22.24 |
| Processing Characteristic | Collapse | Collapse | Collapse | Partially Collapse |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol blend comprising:
   1) from 5 to 40% by weight, based on 100% by weight of said polyol blend, of one or more monofunctional polyethers having a hydroxyl number of less than or equal to 28 mg KOH/g; and containing less than or equal to 20% of copolymerized oxyethylene, based on the total weight of said monofunctional polyether;
   2) from 2 to 80% by weight, based on 100% by weight of said polyol blend, of one or more polyether polyols having a functionality of from 2 to 8, a hydroxyl number of from 20 to 240 mg KOH/q and containing at least 50% of copolymerized oxyethylene, based on the total weight of said polyether polyol 2);
   3) from 10 to 70% by weight, based on 100% by weight of said polyol blend, of one or more polyether polyols having a hydroxyl number of from 47 to 300 mg KOH/g, a functionality of from 2 to 8, and containing from 5 to 45% of copolymerized oxyethylene, based on the total weight of said polyether polyol 3), wherein said polyether polyols do not contain pure EO terminal blocks; and
   4) 5 to 30%, based on 100% by weight of said polyol blend, of a polyether polyol, having a hydroxyl number of from 10 to 45 mg KOH/g and a functionality of from 2 to 8.

2. The polyol blend of claim 1, which comprises from 10 to 30% by weight of component 1), from 15 to 70% by weight of component 2), from 20 to 50% by weight of component 3), and 5 to 30% by weight of component 4).

3. The polyol blend of claim 1, wherein 1) said monofunctional polyether has a hydroxyl number of less than or equal to 20 mg KOH/g, and contains from 2 to 20% of copolymerized oxyethylene, based on the total weight of said monofunctional polyether.

4. The polyol blend of claim 1, wherein 1) said monofunctional polyether has a percentage of primary hydroxyl groups of less than 23% of the total hydroxyl equivalents present in said monofunctional polyether.

5. A polyol blend comprising,
   1) from 5 to 40% by weight, based on 100% by weight of said polyol blend, of one or more monofunctional polyethers having a hydroxyl number of less than or equal to 28 mg KOH/g; and containing less than or equal to 20% of copolymerized oxyethylene, based on the total weight of said monofunctional polyether;

2) from 2 to 80% by weight, based on 100% by weight of said polyol blend, of one or more polyether polyols having a functionality of from 2 to 8, a hydroxyl number of from 20 to 240 mg KOH/g and containing at least 50% of copolymerized oxyethylene, based on the total weight of said polyether polyol 2);

3) from 10 to 70% by weight, based on 100% by weight of said polyol blend, of one or more polyether polyols having a hydroxyl number of from 47 to 300 mg KOH/g, a functionality of from 2 to 8, and containing from 5 to 45% of copolymerized oxyethylene, based on the total weight of said polyether polyol 3), wherein said polyether polyols do not contain pure EO terminal blocks; and 4) 5 to 30%, based on 100% by weight of said polyol blend, of a polyether polyol, having a hydroxyl number of from 10 to 45 mg KOH/g and a functionality of from 2 to 8, and said polyether polyol is capped with oxyethylene and contains a minimum of 40% of primary hydroxyl end groups, based on the total number of hydroxyl end groups present.

6. The polyol blend of claim 1, wherein:
1) said monofunctional polyethers have hydroxyl numbers of less than or equal to 20 mg KOH/g,
2) said polyether polyols have hydroxyl numbers of from 30 to 170 mg KOH/g,
3) said polyether polyols have hydroxyl numbers of from 56 to 240 mg KOH/g, and
4) said polyether polyols have hydroxyl number of from 20 to 40 mg KOH/g.

7. A process for preparing a novel polyol blend comprising blending:
1) from 5 to 40% by weight, based on 100% by weight of said polyol blend, of one or more monofunctional polyethers having a hydroxyl number of less than or equal to 28 mg KOH/g; and containing less than or equal to 20% of copolymerized oxyethylene, based on the total weight of said monofunctional polyether;
2) from 2 to 80% by weight, based on 100% by weight of said polyol blend, of one or more polyether polyols having a functionality of from 2 to 8, a hydroxyl number of from 20 to 240 mg KOH/g and containing at least 50% of copolymerized oxyethylene, based on the total weight of said polyether polyol 2);
3) from 10 to 70% by weight, based on 100% by weight of said polyol blend, of one or more polyether polyols having a hydroxyl number of from 47 to 300 mg KOH/g, a functionality of from 2 to 8, and containing from 5 to 45% of copolymerized oxyethylene, based on the total weight of said polyether polyol 3), wherein said polyether polyols do not contain pure EO terminal blocks; and
4) 5 to 30%, based on 100% by weight of said polyol blend, of a polyether polyol and having a hydroxyl number of from 10 to 45 mg KOH/g and a functionality of from 2 to 8;
wherein at least one of components 1), 2), 3) and 4) is prepared in the presence of a double metal cyanide catalyst.

8. A process for the production of an open celled, flexible polyurethane foam comprising reacting:
(A) one or more di- or polyisocyanate components; with
(B) an isocyanate-reactive component comprising:
1) from 5 to 40% by weight, based on 100% of the combined weight of components (B)1), (B)2), (B)3) and (B)4), of one or more monofunctional polyethers having an average hydroxyl number less than or equal to 28 mg KOH/g, and containing less than 20% of copolymerized oxyethylene, based on the total weight of said monofunctional polyethers;
2) from 2 to 80% by weight, based on 100% of the combined weight of components (B)1), (B)2), B)3) and (B)4), of one or more polyether polyols having a functionality of from 2 to 8, a hydroxyl number of from 20 to 240 mg KOH/g, and containing at least 50% of copolymerized oxyethylene, based on the total weight of said polyether polyol (B)2);
3) from 10 to 70% by weight, based on 100% of the combined weight of components (B)1), (B)2), B)3) and (B)4), of one or more polyether polyols having a hydroxyl number of from 47 to 300 mg KOH/g, a functionality of from 2 to 8, and containing from 5 to 45% of copolymerized oxyethylene, based on the total weight of said polyether polyol (B)3), wherein said polyether polyols do not contain pure EO terminal blocks; and
4) 5 to 30% by weight, based on 100% of the combined weight of (B)1), (B)2), (B)3) and (B)4), of one or more polyether polyols having a hydroxyl number of from 10 to 45 mg KOH/g and a functionality of from 2 to 8;
in the presence of
(C) at least one catalyst;
(D) at least one surfactant; and
(E) at least one blowing agent;
wherein the resultant foam is characterized by an air flow of greater than about 5 scfpm.

9. The process of claim 8, wherein (B) said isocyanate-reactive comprises from 10 to 30% by weight of component 1), from 15 to 70% by weight of component 2), from 20 to 50% by weight of component 3), and 5 to 30% by weight of component 4).

10. The process of claim 8, wherein (B)1) said monofunctional polyether has a hydroxyl number of less than or equal to 20, and contains from 2 to 20% of copolymerized oxyethylene, based on the total weight of said monofunctional polyether.

11. The process of claim 8, wherein (B)1) said monofunctional polyether has a percentage of primary hydroxyl groups of less than 23% of the total hydroxyl equivalents present in said monofunctional polyether.

12. The process of claim 8, wherein (B)4) said polyether polyol is capped with oxyethylene and contains a minimum of 40% of primary hydroxyl end groups, based on the total number of hydroxyl end groups present.

13. The process of claim 8, wherein:
(B)1) said monofunctional polyethers have hydroxyl numbers of less than or equal to 20,
(B)2) said polyether polyols have hydroxyl numbers of from 30 to 170, (B)3) said polyether polyols have hydroxyl numbers of from 56 to 240,
and
(B)4) said polyether polyols have hydroxyl number of from 20 to 40.

14. The process of claim 8, wherein said polyurethane foam is produced at an Isocyanate Index of from 80 to 115.

15. The process of claim 8, wherein the resultant foam is characterized by an air flow of greater than about 6 scfpm.

16. The process of claim 8, wherein the resultant foam has a 95% height recovery time of less than 3 seconds.

17. The process of claim 8, wherein the resultant foam has a 95% height recovery time of greater than 5 seconds.

18. The process of claim 8, wherein the resultant foam has a water droplet penetration time of less than 20 seconds.

19. The process of claim 8, wherein at least one of components (B)1), (B)2), (B)3) and (B)4) is prepared in the presence of a double metal cyanide catalyst.

20. An open celled, flexible polyurethane foam which is characterized by an air flow of greater than about 5 scfpm, and comprises the reaction product of:
(A) one or more di- or polyisocyanate components;
with
(B) an isocyanate-reactive component comprising:
1) from 5 to 40% by weight, based on 100% of the combined weight of components B)1), (B)2), (B)3) and (B)4), of one or more monofunctional polyethers having an average hydroxyl number less than or equal to 28 mg KOH/g, and containing less than 20% of copolymerized oxyethylene, based on the total weight of said monofunctional polyethers;
2) from 2 to 80% by weight, based on 100% of the combined weight of components (B)1), (B)2), B)3) and (B)4), of one or more polyether polyols having a functionality of from 2 to 8, a hydroxyl number of from 20 to 240 mg KOH/g, and containing at least 50% of copolymerized oxyethylene, based on the total weight of said polyether polyol (B)2);
3) from 10 to 70% by weight, based on 100% of the combined weight of components (B)1), (B)2), (B)3) and (B)4), of one or more polyether polyols having a hydroxyl number of from 47 to 300 mg KOH/g, a functionality of from 2 to 8, and containing from 5 to 45% of copolymerized oxyethylene, based on the total weight of said polyether polyol (B)3), wherein said polymer polyols do not contain pure EO terminal blocks;
and
4) 5 to 30% by weight, based on 100% of the combined weight of (B)1), (B)2), (B)3) and (B)4), of one or more polyether polyols having a hydroxyl number of from 10 to 45 mg KOH/g and a functionality of from 2 to 8;
in the presence of
(C) at least one catalyst;
(D) at least one surfactant;
and
(E) at least one blowing agent.

21. The foam of claim 20, wherein (B) said isocyanate-reactive comprises from 10 to 30% by weight of component 1), from 15 to 70% by weight of component 2), from 20 to 50% by weight of component 3), and 5 to 30% by weight of component 4).

22. The foam of claim 20, wherein (B)1) said monofunctional polyether has a hydroxyl number of less than or equal to 20, and contains from 2 to 20% of copolymerized oxyethylene, based on the total weight of said monofunctional polyether.

23. The foam of claim 20, wherein (B)1) said monofunctional polyether has a percentage of primary hydroxyl groups of less than 23% of the total hydroxyl equivalents present in said monofunctional polyether.

24. The foam of claim 20, wherein (B)4) said polyether polyol is capped with oxyethylene and contains a minimum of 40% of primary hydroxyl end groups, based on the total number of hydroxyl end groups present.

25. The foam of claim 20, wherein:
(B)1) said monofunctional polyethers have hydroxyl numbers of less than or equal to 20,
(B)2) said polyether polyols have hydroxyl numbers of from 30 to 170,
(B)3) said polyether polyols have hydroxyl numbers of from 56 to 240,
and
(B)4) said polyether polyols have hydroxyl number of from 20 to 40.

26. The foam of claim 20, wherein said polyurethane foam is produced at an Isocyanate Index of from 80 to 115.

27. The foam of claim 20, wherein the resultant foam is characterized by an air flow of greater than about 6 scfpm.

28. The foam of claim 20, wherein the resultant foam has a 95% height recovery time of less than 3 seconds.

29. The foam of claim 20, wherein the resultant foam has a 95% height recovery time of greater than 5 seconds.

30. The foam of claim 20, wherein the resultant foam has a water droplet penetration time of less than 20 seconds.

31. The foam of claim 20, wherein the air flow is greater than 5 scfpm without mechanical crushing.

32. The foam of claim 20, wherein at least one of components (B)1), (B)2), (B)3) and (B)4) is prepared in the presence of a double metal cyanide catalyst.

* * * * *